(12) United States Patent
Nakayama et al.

(10) Patent No.: US 9,771,918 B2
(45) Date of Patent: Sep. 26, 2017

(54) IGNITION SYSTEM

(71) Applicant: DENSO CORPORATION, Kariya, Aichi-pref. (JP)

(72) Inventors: Satoru Nakayama, Kariya (JP); Makoto Toriyama, Kariya (JP); Akimitsu Sugiura, Kariya (JP); Masahiro Ishitani, Kariya (JP); Yuuki Kondou, Kariya (JP); Kanechiyo Terada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/783,898

(22) PCT Filed: Apr. 11, 2014

(86) PCT No.: PCT/JP2014/060543
§ 371 (c)(1),
(2) Date: Oct. 12, 2015

(87) PCT Pub. No.: WO2014/168244
PCT Pub. Date: Oct. 16, 2014

(65) Prior Publication Data
US 2016/0047352 A1 Feb. 18, 2016

(30) Foreign Application Priority Data

Apr. 11, 2013 (JP) .................................. 2013-082713
Apr. 11, 2013 (JP) .................................. 2013-082959
Feb. 28, 2014 (JP) .................................. 2014-037921

(51) Int. Cl.
*F02P 9/00* (2006.01)
*F02P 3/08* (2006.01)
(Continued)

(52) U.S. Cl.
CPC ............. *F02P 9/002* (2013.01); *F02P 3/0453* (2013.01); *F02P 3/05* (2013.01); *F02P 3/0876* (2013.01);
(Continued)

(58) Field of Classification Search
CPC .. F02P 3/05; F02P 3/005; F02P 3/0453; F02P 3/09; F02P 3/0876; F02P 3/0407;
(Continued)

(56) References Cited

U.S. PATENT DOCUMENTS 4,998,526 A 3/1991 Gokhale
7,730,880 B1 6/2010 Nagai et al.
(Continued)

FOREIGN PATENT DOCUMENTS

DE 28 05 782 8/1979
DE 10 2011 006 268 10/2012
(Continued)

OTHER PUBLICATIONS

English translation of International Preliminary Report on Patentability (4 pages) dated Oct. 22, 2015 issued in corresponding Japanese Application No. PCT/JP2014/060543.
(Continued)

*Primary Examiner* — Hai Huynh
(74) *Attorney, Agent, or Firm* — Nixon & Vanderhye P.C.

(57) ABSTRACT

It is possible to adjust electromagnetic energy introduced from a low-voltage side of a primary winding 20 of an ignition coil 2 after start discharging to a spark plug 1 from the ignition coil 2 in the correct proportion by threshold-determining either one or both of a primary voltage V1 applied to a primary side of the ignition coil 2 and a secondary current I2 flowing in a secondary side of the ignition coil 2, and by opening and closing a discharging switch 32 disposed between an auxiliary power supply 3
(Continued)

including an energy storage coil 330 and a low-voltage side terminal 201 of the ignition coil 2.

9 Claims, 13 Drawing Sheets

(51) Int. Cl.
- *F02P 3/09* (2006.01)
- *F02P 3/045* (2006.01)
- *F02P 3/05* (2006.01)
- *F02P 5/15* (2006.01)
- *F02P 3/00* (2006.01)
- *F02P 15/10* (2006.01)
- *F02P 3/04* (2006.01)

(52) U.S. Cl.
CPC .............. *F02P 3/09* (2013.01); *F02P 5/1502* (2013.01); *F02P 3/005* (2013.01); *F02P 3/0407* (2013.01); *F02P 15/10* (2013.01); *Y02T 10/46* (2013.01)

(58) Field of Classification Search
CPC  F02P 5/1502; F02P 9/002; F02P 15/08; F02P 15/10; F02P 15/12; Y02T 10/46
USPC ........ 123/601, 605, 618, 621, 623; 361/256, 361/257
See application file for complete search history.

(56) References Cited

U.S. PATENT DOCUMENTS

| | | |
|---|---|---|
| 2002/0066444 A1 | 6/2002 | Ikeda et al. |
| 2007/0175461 A1 | 8/2007 | Wada et al. |
| 2007/0181110 A1 | 8/2007 | Toriyama et al. |
| 2010/0147274 A1 | 6/2010 | Nagai et al. |
| 2017/0045025 A1* | 2/2017 | Nakayama .............. F02P 3/051 |

FOREIGN PATENT DOCUMENTS

| | | |
|---|---|---|
| JP | 8-4637 | 1/1996 |
| JP | 2000-199470 | 7/2000 |
| JP | 2002-168170 | 6/2002 |
| JP | 2007-211631 | 8/2007 |
| JP | 2007-231927 | 9/2007 |
| JP | 2009-52435 | 3/2009 |
| JP | 4362675 | 11/2009 |
| JP | 2010-144534 | 7/2010 |
| JP | 2010-174644 | 8/2010 |
| JP | 2011-174471 | 9/2011 |
| JP | 2014-206061 | 10/2014 |
| JP | 2014-206068 | 10/2014 |
| JP | 2014-218997 | 11/2014 |

OTHER PUBLICATIONS

Written Opinion (3 pages) dated Jun. 24, 2014 issued in corresponding Japanese Application No. PCT/JP2014/060543 and English translation (3 pages).

International Search Report dated Jun. 24, 2014 issued in PCT/JP2014/060543—English translation (1 page).

* cited by examiner

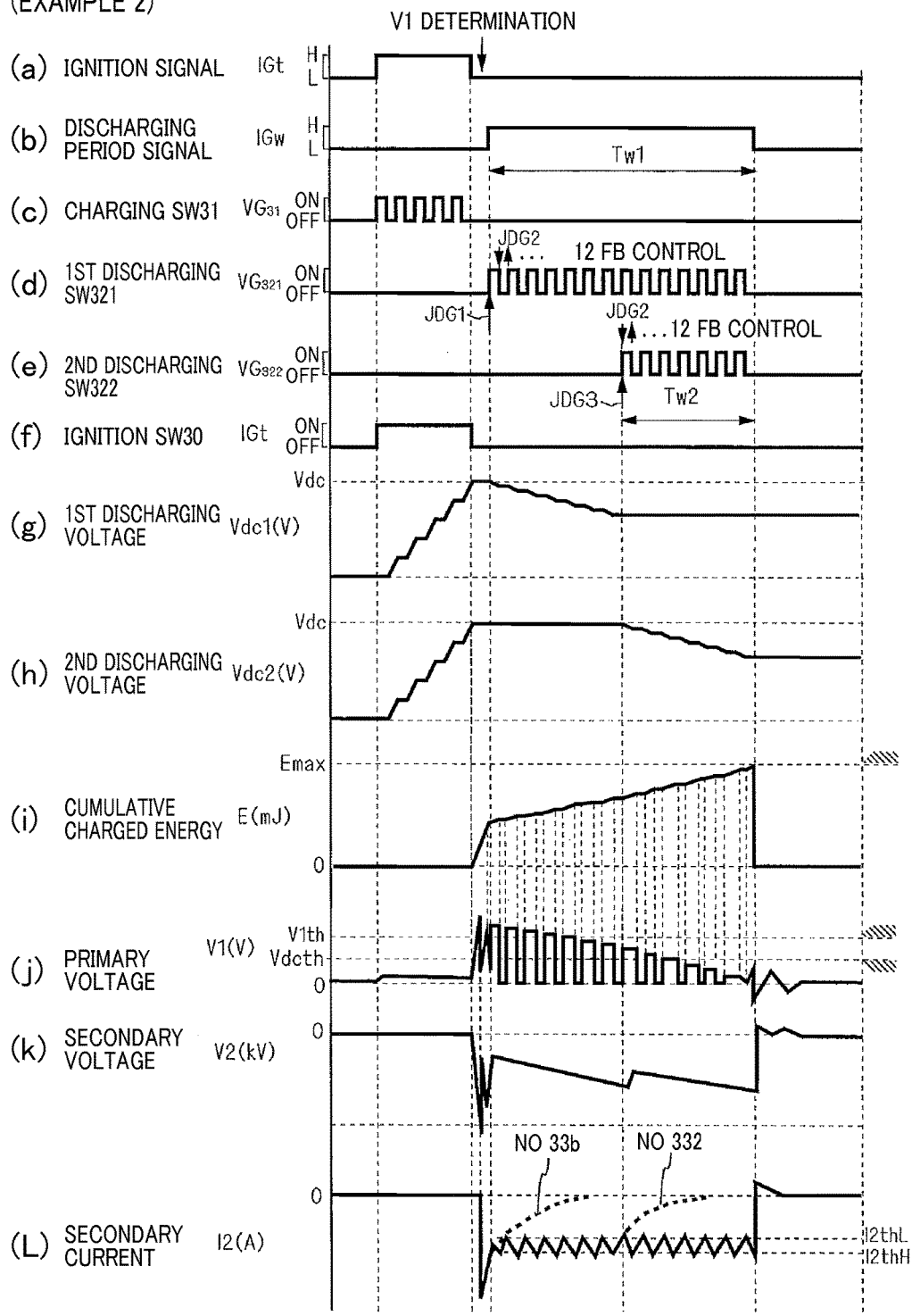

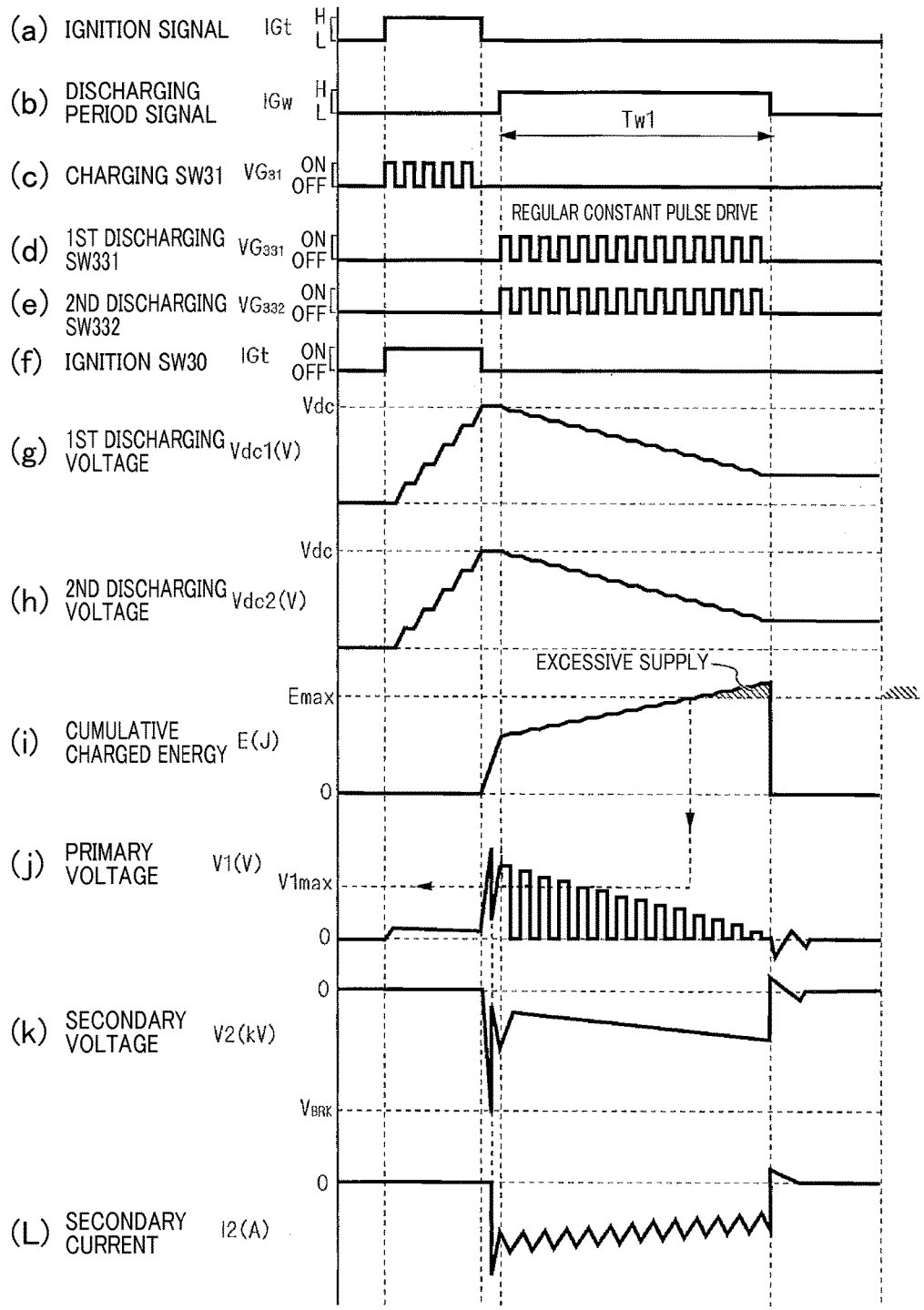

(COMPARATIVE EXAMPLE 2)

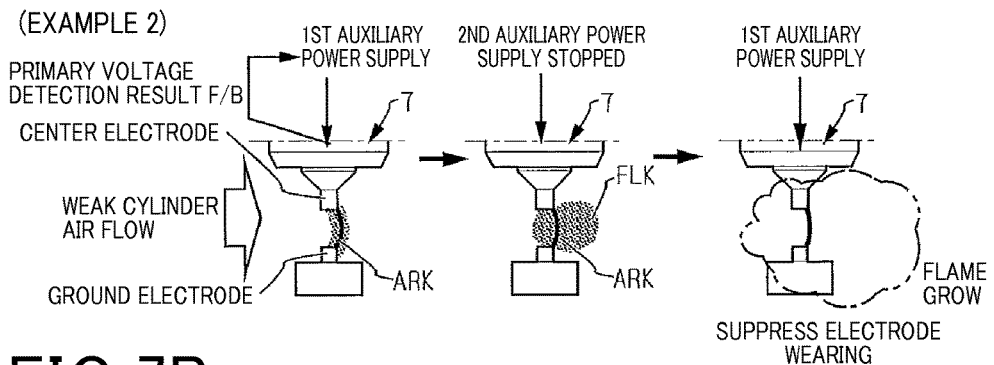
FIG.7A (EXAMPLE 2)
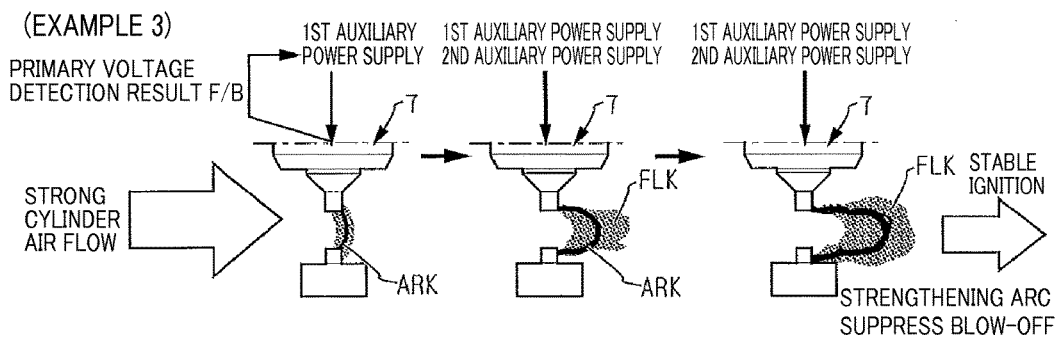
FIG.7B (EXAMPLE 3)
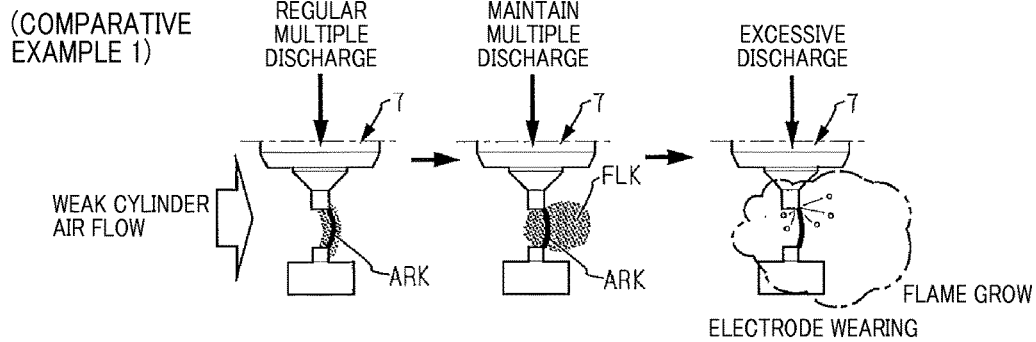
FIG.8A (COMPARATIVE EXAMPLE 1)
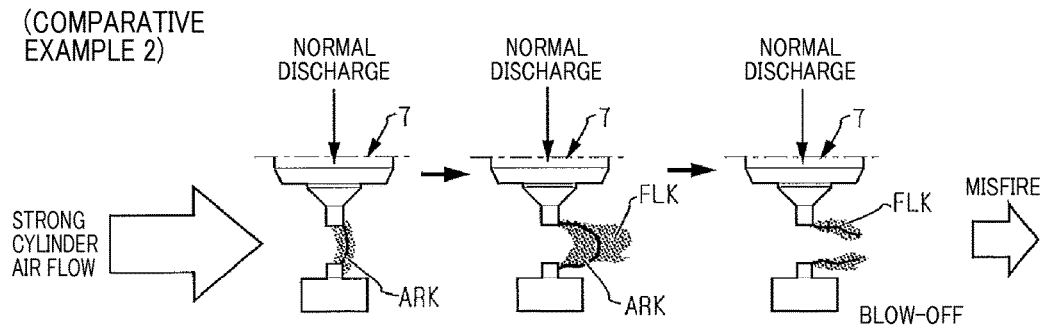
FIG.8B (COMPARATIVE EXAMPLE 2)

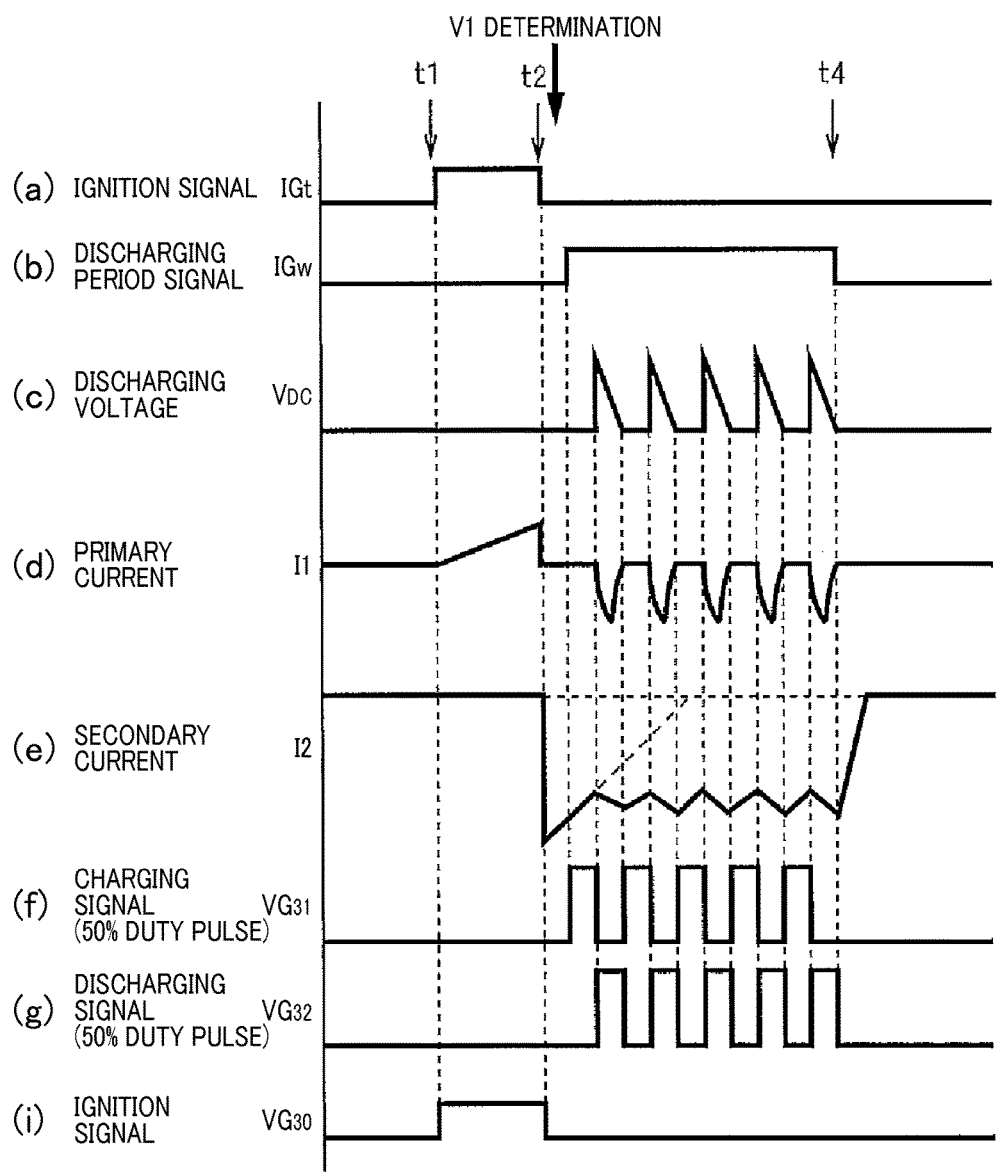

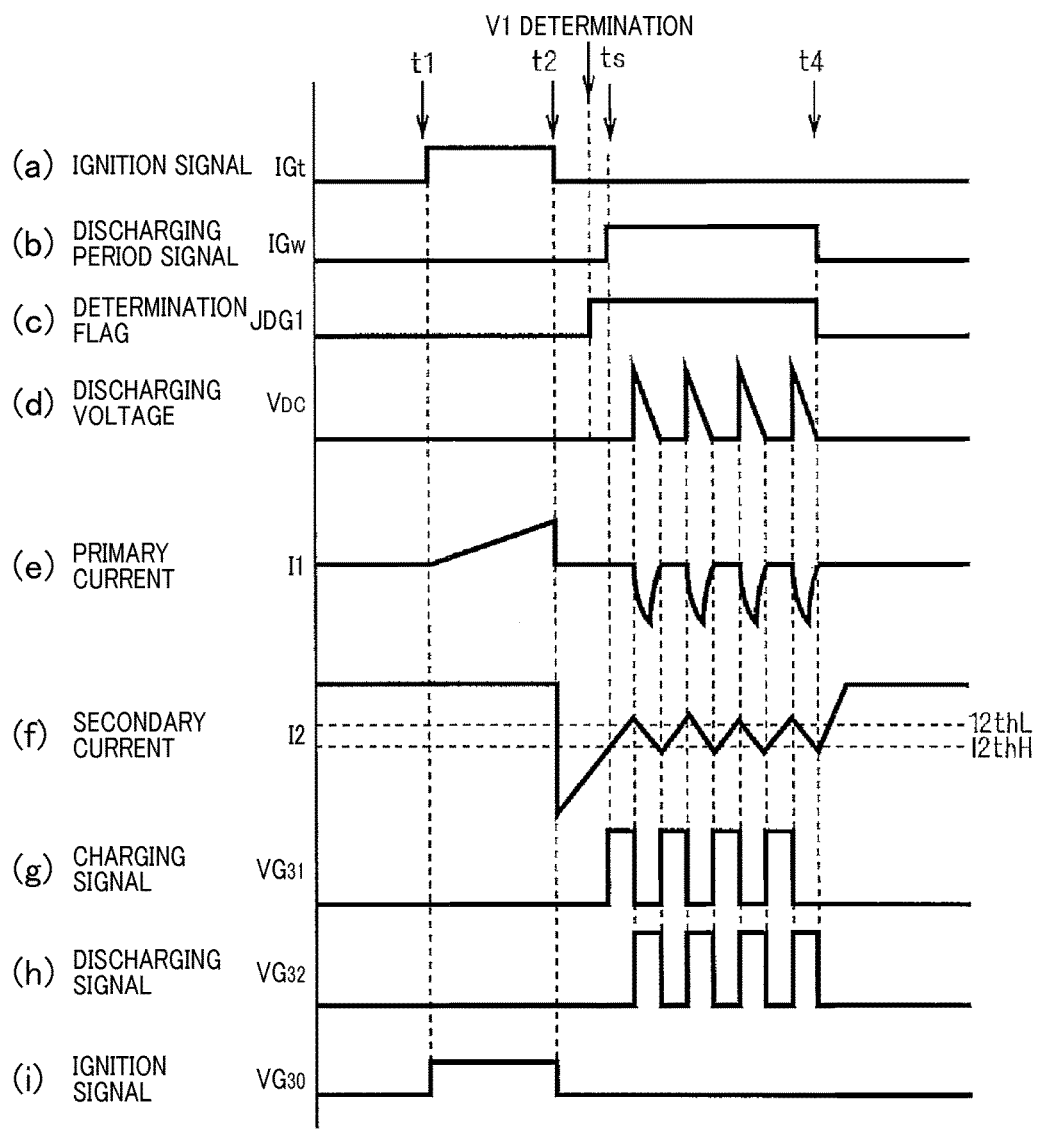

IGNITION SYSTEM

CROSS REFERENCE TO RELATED APPLICATIONS

This application is the U.S. national phase of International Application No. PCT/JP2014/060543 filed 11 Apr. 2014 which designated the U.S. and claims priority to JP Patent Applications No. 2013-082959 filed 11 Apr. 2013, No. 2013-082713 filed 11 Apr. 2013 and No. 2014-037921 filed 28 Feb. 2014, the entire contents of each of which are hereby incorporated by reference.

TECHNICAL FIELD

The present invention relates to an ignition system that ignites an air-fuel mixture in a cylinder of an internal combustion engine.

BACKGROUND ART

In an ignition system that ignites an air-fuel mixture in a cylinder of an internal combustion engine, a system configured to perform so-called multiple-discharge in order to improve a combustion condition of the air-fuel mixture is known.

For example, a configuration that produces a plurality of discharges intermittently in one combustion stroke is disclosed in Patent Document 1.

On the other hand, a configuration that connects two ignition coils in parallel in order to obtain long multiple-discharge characteristics of the discharge time is disclosed in Patent Document 2.

Furthermore, an ignition system for an internal combustion engine for controlling a second switch means to be repeatedly turned on/off to provide an inversion of positive and negative current to a spark plug so that a stable predetermined output current flows even when a voltage of a power supply connected to an energy storage coil is varied is disclosed in Patent Document 3. The control includes a period where energy stored in the energy storage coil is increased sharply by turning a first switching means on during a period that the second switching means is turned off, and a period where the energy stored in the energy storage coil is increased gradually by turning a fourth switch means on during the period that the second switching means is turned off.

PRIOR ART

Patent Document

[Patent Document 1] Japanese Patent Application Laid-Open Publication No. 2000-199470
[Patent Document 2] Japanese Patent Application Laid-Open Publication No. 2007-231927
[Patent Document 3] Japanese Patent Application Laid-Open Publication No. 2011-174471

DISCLOSURE OF THE INVENTION

Problems to be Solved by the Invention

However, as disclosed in Patent Document 1 and Patent Document 3, when a plurality of discharges are produced intermittently in one combustion stroke, an ignition discharge current becomes zero repeatedly during a period from a start to an end of the ignition discharge in the combustion stroke.

Thus, particularly, when a gas flow rate in a cylinder is large, so-called blow-off occurs, and this may cause a problem that ignition energy is lost.

On the other hand, although the ignition discharge current does not become zero repeatedly during the period from the start to the end of the ignition discharge in the configuration that connects the two ignition coils in parallel as disclosed in Patent Document 2, the configuration of the system becomes complicated, and there is a problem that the size of the system becomes large.

Further, in the prior art disclosed in Patent Document 2, since the structure requires greatly more energy than that required for ignition, there is a problem that wasteful power consumption occurs.

The present invention has been made in light of the problems set forth above and has as its object to provide an engine ignition system of an internal combustion engine that can prevent discharge blow-off, suppress an electrode wear, and improve ignition robustness by maintaining a stable discharge even if individual variables such as an aging of a spark plug or changes in operating conditions of an engine occur.

Means for Solving the Problems

An ignition system of the present invention includes a spark plug, a DC power supply, an ignition coil, a control circuit section, and an electronic control unit.

The spark plug ignites an air-fuel mixture in a cylinder of an internal combustion engine.

The ignition coil includes a primary winding of which a high-voltage side terminal at one end is connected to the DC power supply, and a secondary winding that is wound having a secondary number of turns with a predetermined winding ratio with respect to a primary number of turns of the primary winding.

The ignition coil generates a high secondary voltage in the secondary winding according to increase or decrease of a primary current flowing through the primary winding, and the spark plug is connected to a plug-side terminal that is one end of the secondary winding.

The control circuit section controls the discharge from the ignition coil to the spark plug.

The electronic control unit generates an ignition signal that controls ignition timing according to operating conditions of the internal combustion engine, and a discharge period signal that controls discharge from an auxiliary power supply to start.

The control circuit section includes the auxiliary power supply, an ignition switch and a charging switch, a discharging switch and a driver circuit section, and an auxiliary energy requirement determiner.

The auxiliary power supply includes an energy storage coil that is charged at least by the DC power supply.

The ignition switch has a control terminal for ignition, a power supply side terminal for ignition, and a ground side terminal for ignition. The ignition switch is a semiconductor element configured to control opening and closing of conduction between the power supply side terminal for ignition and the ground side terminal for ignition based on the ignition signal inputted to the control terminal for ignition. The power supply side terminal for ignition of the ignition switch is connected to a ground side terminal on another end of the primary winding and the ground side terminal for ignition is grounded, and controls the start of discharging from the ignition coil to the spark plug by controlling the opening and closing of conduction from the DC power supply to the ignition coil.

The charging switch includes a control terminal for charging, a power supply side terminal for charging, and a ground side terminal for charging. The charging switch is a semiconductor element configured to control opening and closing of conduction between the power supply side terminal for the charging and the ground side terminal for the charging based on a charging control signal inputted to the control terminal for the charging. The charging switch controls the charging of the auxiliary power supply from the DC power supply.

The discharging switch has a control terminal for discharging, a power supply side terminal for discharging, and a ground side terminal for discharging. The discharging switch is a semiconductor element configured to control opening and closing of conduction between the power supply side terminal for discharging and the ground side terminal for discharging based on a discharging control signal inputted to the control terminal for discharging. The discharging switch controls the discharge to the ignition coil from the auxiliary power supply.

The driver circuit section controls the opening and closing of the ignition switch, the charging switch, and the discharging switch in accordance with the ignition signal and the discharge period signal.

The auxiliary energy requirement determiner determines whether or not an energy charge from the auxiliary power supply is necessary.

When the auxiliary energy requirement determiner determines that the discharge from the auxiliary power supply is necessary during the ignition discharge of the spark plug that has been started by turning the ignition switch off, in addition to storing electromagnetic energy in the energy storage coil by turning the charging switch on, a secondary current flowing through the secondary winding is increased or decreased by varying the primary current by supplying the electromagnetic energy to a low voltage side terminal of the primary winding from the auxiliary power supply by controlling the opening and closing of the charging switch and the discharging switch.

EFFECTS OF THE INVENTION

Here, after the ignition discharge is started at the spark plug, the secondary current (hereinafter, appropriately referred to as a discharging current) becomes near zero with thee lapse of time. In this respect, in the structure of the present invention, first, the electromagnetic energy is stored in the energy storage coil by turning the charging switch on.

The electromagnetic energy stored in such a manner is released from the energy storage coil by turning the charging switch off and by turning the discharging switch on during the ignition discharge. The electromagnetic energy released from the energy storage coil is supplied from the ground side terminal to the primary winding.

That is, the primary current is supplied to the primary winding from the energy storage coil. At this time, an additional current accompanying the supply of the primary current is superposed with respect to the discharge current that has flowed through until then. Thereby, the current flowing through the primary winding is enhanced, and an induced electromotive force higher than a discharge maintaining voltage is generated in the secondary winding. Therefore, the secondary current, i.e., the discharge current, is enhanced, and the discharge current can be well secured to the extent capable of maintaining the spark discharge. Moreover, since it is configured to superpose the current from the other end, that is, the ignition switch side of the primary winding, the superposition of the current can be realized at a low voltage.

Therefore, according to the present invention, generation of so-called blow-off and ignition energy loss due to this are favorably suppressed from occurring by a simple system configuration.

Further, by charging the energy from the low voltage side (the ground side or a first switching side) of the primary winding in this manner, it is possible to charge the energy with a lower voltage compared with a case where the energy is charged from the secondary winding side.

In this respect, when the energy is charged from the high voltage side (the DC power supply side) of the primary winding at a higher voltage than the voltage of the DC power supply, the efficiency is deteriorated due to current flowing into the DC power supply.

In contrast, according to the present invention, as described above, since the energy is charged from the low voltage side of the primary winding, there is an excellent effect that it is possible to charge the energy more easily and efficiently.

Furthermore, in the present invention, since the energy is supplied in the correct proportion from the auxiliary power supply only when the energy supply from the auxiliary power supply is determined to be necessary by the auxiliary energy requirement determiner, the electrode is suppressed from wearing due to the excess energy charge.

BRIEF DESCRIPTION OF THE DRAWINGS

FIG. 5 shows a timing chart for describing an operation in a case of suppressing an electrode of the ignition system of FIG. 4 from wearing as an example 1;

Figure 9A:
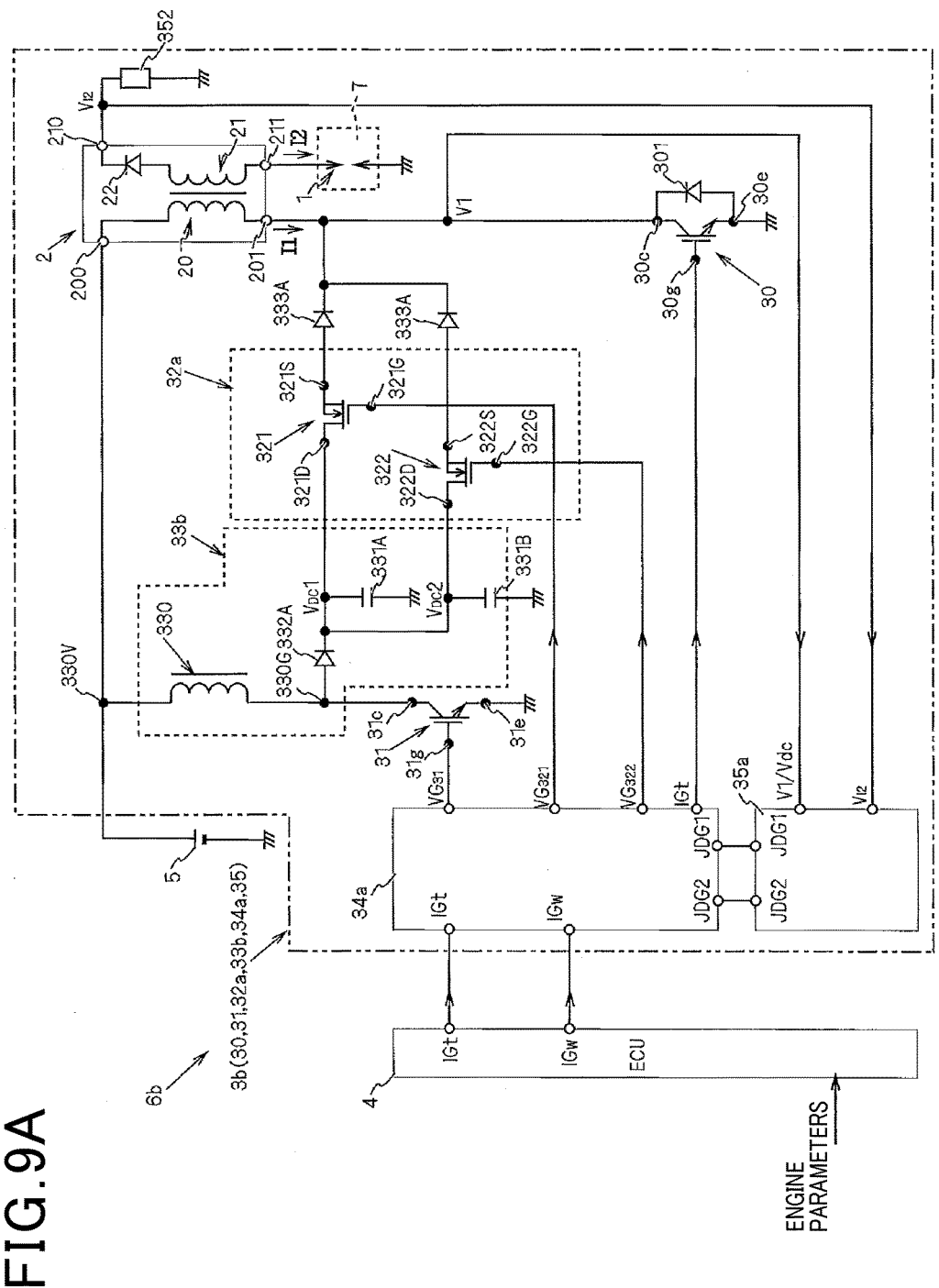
Figure 9B:
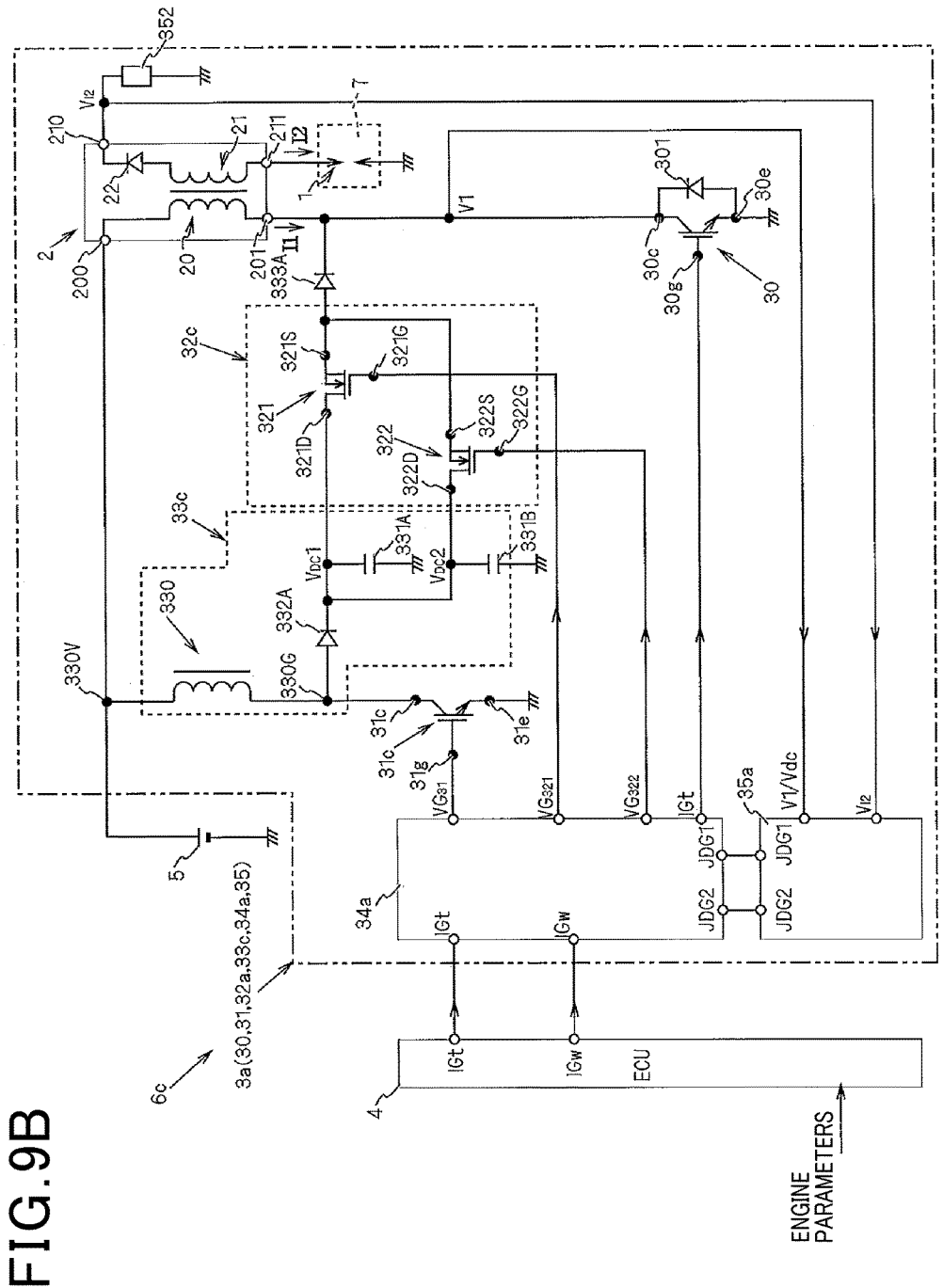
Figure 10:
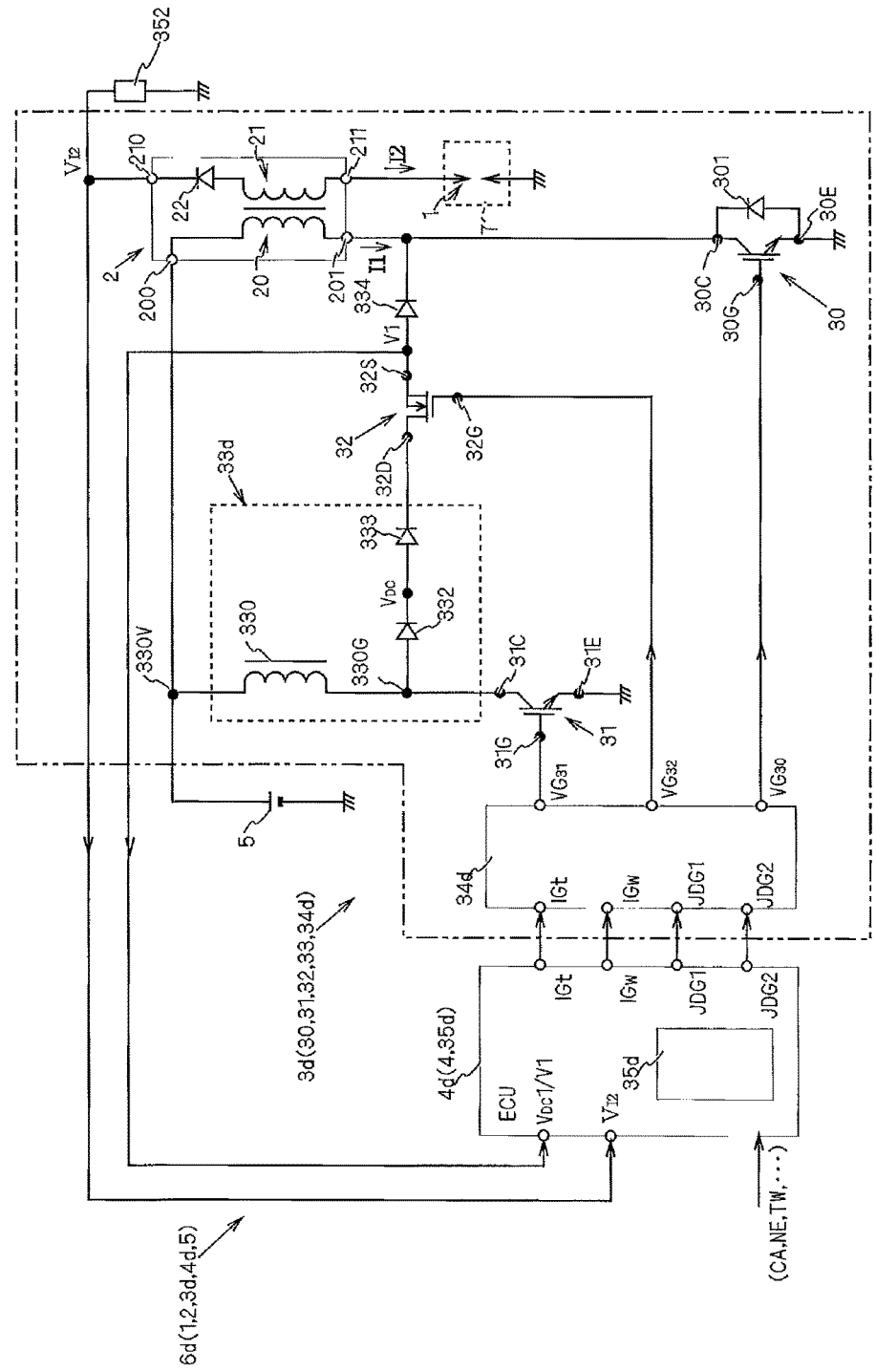

6B shows a timing chart in a case where problems of a blow-off in a conventional ignition system are reproduced as a comparative example 2;

FIG. 7A shows a schematic diagram of an electrode wear suppressing effect in the ignition system of the present invention as the example 1;

FIG. 7B shows a schematic diagram of a blow-off suppressing effect in the ignition system of the present invention as an example 2;

FIG. 8A shows a schematic diagram of an electrode wearing problem of the conventional ignition system as the comparative example 1;

FIG. 8B shows a schematic diagram of a blow-off problem of the conventional ignition system as the comparative example 2;

FIG. 9A shows an outline of a circuit diagram of an ignition system according to a first modification of the second embodiment of the present invention;

FIG. 9B shows an outline of a circuit diagram of an ignition system according to a second modification of the second embodiment of the present invention;

FIG. 10 shows an outline of a circuit diagram of an ignition system according to a third embodiment of the present invention;

FIG. 11A shows a timing chart of an operation of the ignition system in FIG. 10; and FIG. 11B shows a timing chart of an operation of a modification of the ignition system according to the third embodiment of the present invention.

MODE FOR CARRYING OUT THE INVENTION

<Configuration of Engine System>

Figure 1:
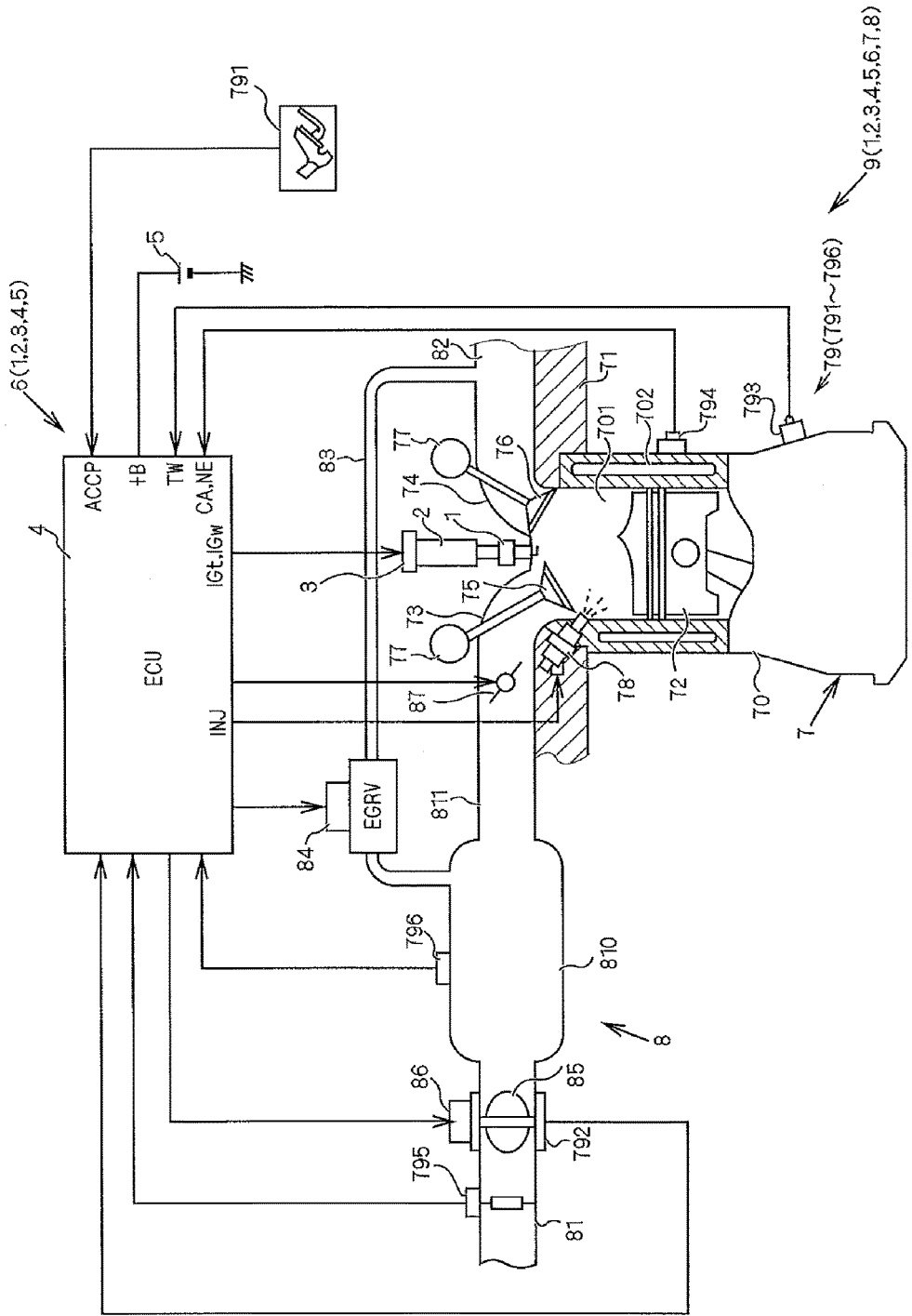
FIG. 1 shows a schematic diagram of an engine system including an ignition system according to an embodiment of the present invention.

First, prior to a description of an ignition system 6 of the present invention, an outline of a configuration of an engine system 9 to which the ignition system of the present invention is applied will be described with reference to FIG. 1.

An engine system 9 is configured by an engine 7 that is a spark-ignition type internal combustion engine, an ignition system 6, and an intake and exhaust mechanism 8. A cylinder 701 and a water jacket 702 are formed inside an engine block 70 that constitutes a main body of an engine 7. The cylinder 701 is provided so as to accommodate the piston 72 reciprocally movably. The water jacket 702 is a space where cooling fluid is able to flow, and is provided so as to surround the cylinder 701.

An intake port 73 and an exhaust port 74 are formed to be communicable with the cylinder 701 in a cylinder head 71 that is a top of the engine block 70. Further, an intake valve 75 for controlling a communication state between the intake port 73 and the cylinder 702, an exhaust valve 76 for controlling a communication state between the exhaust port 74 and the cylinder 702, and a valve driving mechanism 77 for opening and closing the intake valve 75 and the exhaust valve 76 at a predetermined timing are provided in the cylinder head 71.

Furthermore, an injector 78 and a spark plug 1 are mounted on the engine block 70. The injector 78 is provided so as to inject fuel directly into the cylinder 701 in the present embodiment. The spark plug 1 is provided so as to ignite air-fuel mixture in the cylinder 701.

The intake and exhaust mechanism 8 is connected to the engine 7. Three types of gas passages, namely, an intake pipe 81 (including an intake manifold 811 and a surge tank 810), an exhaust pipe 82, and an EGR passage 83 are provided in the intake and exhaust mechanism 8.

The intake manifold 811 is connected to the intake port 73. The surge tank 810 is disposed in an upstream side in an intake passage flow direction from the intake manifold 811. The exhaust pipe 82 is connected to the exhaust port 74.

The EGR passage 83 connects between the exhaust pipe 82 and the surge tank 810 so that a part of the exhaust gas discharged to the exhaust pipe 82 can be introduced into the intake air (EGR stands for Exhaust Gas Recirculation).

An EGR control valve 84 is interposed in the EGR passage 83.

The EGR control valve 84 is provided capable of controlling an EGR rate (mixing ratio of the exhaust gas in a gas before combustion to be sucked into the cylinder 701) by its opening degree.

Although a high EGR rate reduces fuel consumption and NOx in the exhaust gas, ignitability may be deteriorated, and blow-off is likely to occur.

Further, the ignitability may be deteriorated even in an excessive intake mixture engine thereby reducing fuel consumption by increasing an amount of intake air from the intake pipe 81 by providing a turbocharger.

In such an engine having difficult ignitability, it is possible to realize a stable ignition by using the ignition system 6 according to the present invention.

A throttle valve 85 is interposed in the intake pipe 81 on an upstream side in the intake passage flow direction from the surge tank 810.

An opening degree of the throttle valve 85 is controlled by an operation of a throttle actuator 86 such as a DC motor.

An air flow control valve 87 for generating a swirl flow or tumble flow is provided in a vicinity of the intake port 73.

The ignition system 6 according to the present invention is provided to the engine system 9. The ignition system 6 is configured by the spark plug 1, an ignition coil 2, a control circuit section 3, an electronic control unit 4, and a DC power supply 5, and controls an operation of the spark plug 1 (i.e., performs ignition control in the engine 7).

The spark plug 1 generates spark discharge in the cylinder 701 by an application of a high voltage from the ignition coil 2, and ignites the air-fuel mixture. In the present invention, the configuration of the spark plug 1 is not intended to be particularly limited, and it is possible to use a known spark plug of so-called spark discharge type appropriately.

In the present invention, even in a condition of difficult ignitability when a strong air current is generated in the cylinder 701 or concentration of a mixture of fuel and air introduced into a cylinder is lean, the discharge is aimed to be maintained by charging energy in a superposed manner from an auxiliary power supply 33 provided in the control circuit section 3 to the ignition coil 2.

The control circuit section 3 is configured to control the discharge from the ignition coil 2 to the spark plug 1 so as to generate a spark discharge in the spark plug 1 for igniting the air-fuel mixture in the cylinder 701. The electronic control unit 4 (hereinafter referred to as an ECU 4.) is so-called engine ECU (ECU stands for Electronic Control Unit), and controls operations of each section including the injector 78 and the control circuit section 3 according to conditions of the engine 7 (hereinafter referred to as engine parameters) obtained based on outputs of various sensors 79 (791-796) to be described later such as a rotational speed sensor 793.

A more specific ignition control method will be described later with reference to FIG. 3.

The ECU 4 is adapted to generate and output an ignition signal IGt and a discharge period signal IGw based on the obtained engine parameters.

The ignition signal IGt and the discharge period signal IGw are intended to regulatory optimal ignition timing and a discharge current corresponding to a gas condition in the cylinder 701 and a required output of the engine 7 (they change according to the engine parameters).

The rotational speed sensor 793 is a sensor for detecting (acquiring) an engine rotational speed Ne (also referred to as number of rotations of an engine).

The rotational speed sensor 793 is attached to the engine block 70 so as to generate a pulsed output according to a rotational angle of a crankshaft (not shown) that rotates in association with a reciprocating motion of the piston 72.

A coolant temperature sensor 794 is a sensor for detecting (acquiring) the coolant temperature Tw that is the temperature of the cooling fluid flowing through inside the water jacket 702, and is attached to the engine block 70.

An air flow meter 795 is a sensor for detecting (acquiring) an intake air volume Ga (mass flow rate of the intake air introduced into the cylinder 701 by flowing through the intake pipe 81). The air flow meter 795 is attached to the intake pipe 81 in the upstream side in the intake passage flow direction from the throttle valve 85. An intake pressure sensor 796 is a sensor for detecting (acquiring) the intake pressure Pa that is a pressure in the intake pipe 81, and is attached to the surge tank 810.

A throttle opening degree sensor 792 is a sensor that generates an output corresponding to the opening degree of the throttle valve 85 (throttle opening degree THA), and is incorporated in the throttle actuator 86. An accelerator position sensor 791 is provided to generate an output corresponding to an operation amount of an accelerator (not shown) (accelerator operation amount ACCP).

<First Embodiment>

Figure 2:
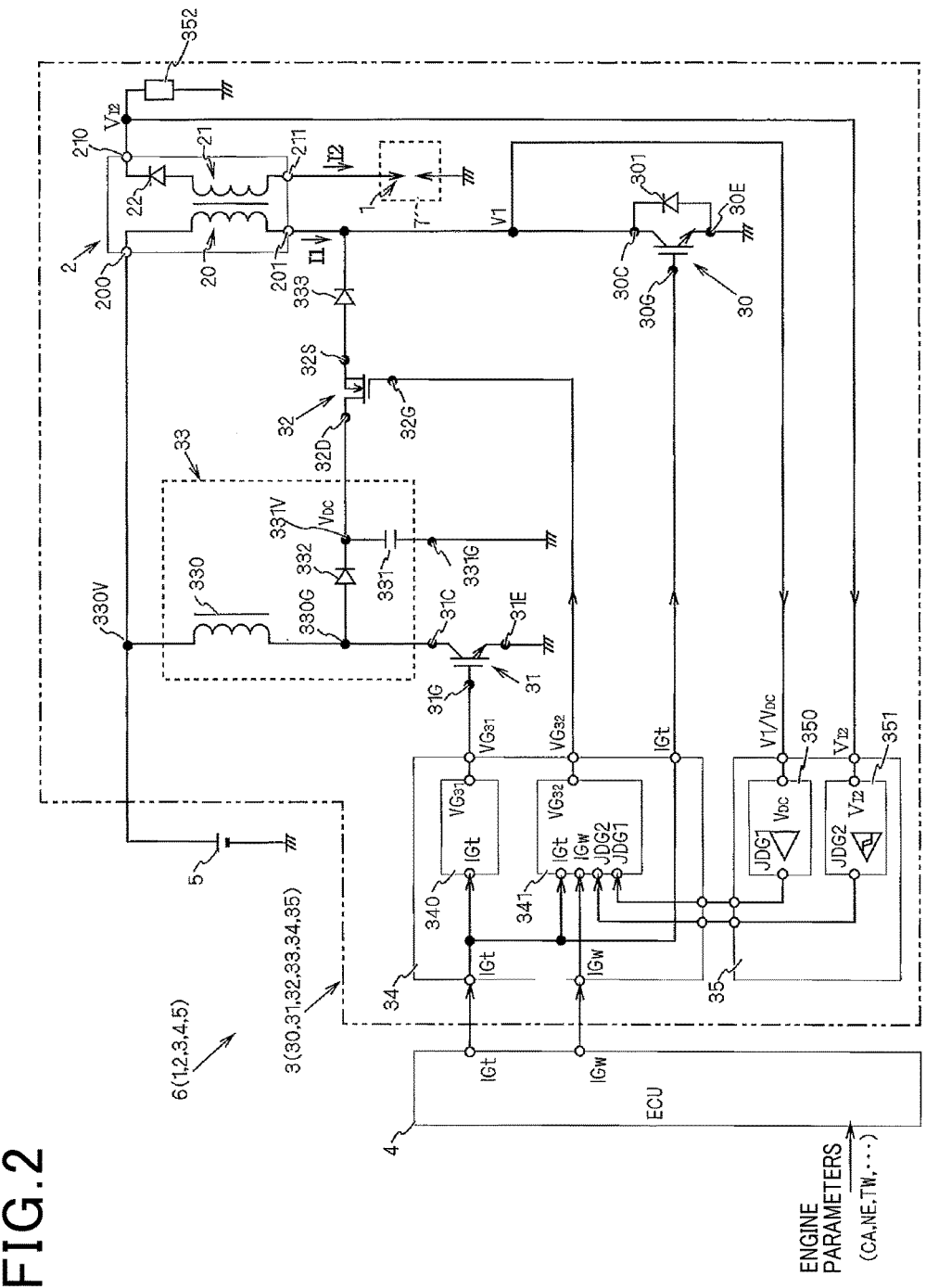
FIG. 2 shows an outline of a circuit diagram of the ignition system according to a first embodiment of the present invention.

An outline of the ignition system 6 according to a first embodiment of the present invention will be described with reference to FIG. 2.

The ignition system 6 is configured by the spark plug 1 that generates a spark discharge and ignites the fuel-air mixture introduced into the cylinders of the engine 7, the ignition coil 2 that applies the high voltage and supplies the discharge energy to the spark plug 1, the control circuit section 3 that controls the energy supply to the ignition coil 2, the ECU 4 that controls the control circuit section 3 by outputting the ignition signal IGt and the discharge period signal IGw according to the operating conditions of the engine 7, and the DC power supply 5.

The spark plug 1 is provided with a pair of electrodes facing to each other via an insulator (not shown), and one of the electrodes is grounded, while another one of the electrodes is connected to a ground-side terminal 211 of a secondary winding 21 of the ignition coil 20.

The ignition system 6 of the present invention is to ignite the air-fuel mixture introduced into the cylinder 701 by generating a spark discharge by applying a high voltage to the spark plug 1 provided for each cylinder 701 of the above-mentioned engine 7.

Generally, in so-called transistor ignition, although it is possible to cause early discharge by charging a primary winding 20 with the power supply voltage of the DC power supply 5, opening and closing an ignition switch 30, and generating a very high secondary voltage V2 to the secondary winding 21, if the discharge is extended by a high air flow in the cylinder 701, the discharge period is shortened, and there is a possibility that the ignition becomes unstable.

However, in the ignition system 6 of the present invention, it is possible to obtain a stable ignition by lengthening the discharge period by charging energy by the discharge from an auxiliary power supply 33 after the discharge has started.

A vehicle mounted battery or a known DC stabilized power supply or the like that DC-converts an AC power supply by a regulator or the like is used as the DC power supply 5, and it supplies a constant DC voltage, such as 12V, or 24V.

The ignition coil 2 has the primary winding 20 to which only a predetermined primary number of turns N1 is wound, and has the secondary winding 21 to which only a predetermined secondary number of turns N2 is wound.

The ignition coil 2, as is well known, is configured to generate the secondary voltage V2 that is winding ratio (N =N2/N1) times the primary voltage V1 to the secondary winding 21 by increasing and decreasing a primary current I1 that is flowing through the primary winding 20.

A non-ground side output terminal of the DC power supply 5 (specifically, a positive terminal) is connected to a high-voltage side terminal 200 (which may also be referred to as a non-ground side terminal) which is a first end of the primary winding. Meanwhile, a low-voltage side terminal 201 (which may also be referred to as a ground side terminal) which is a second end of the primary winding 20 is connected to the ground side via the ignition switch 30. That is, the DC power supply 5 is provided so as to make the primary current I1 flow in the primary winding 20, defining a direction from the high-voltage side terminal 200 to the low-voltage side terminal 201 as positive when the ignition switch 30 is turned on.

A non-plug side terminal 210 of the first end side of the secondary winding 21 is connected to the ground side via a diode 22.

An anode of the diode 22 is connected to the non-ground side terminal 210 of the secondary winding 21 so as to direct a secondary current (discharging current) in a direction from the spark plug 1 to the secondary winding 21 (i.e., a current I2 in the drawing is a negative value).

Meanwhile, the plug-side terminal 211 at the second end side of the secondary winding 21 is connected to the spark plug 1.

The diode 22 regulates the direction of the secondary current I2 flowing through the secondary winding 21 of the ignition coil 2.

The control circuit section 3 is configured by the ignition switch 30, a charging switch 31, a discharging switch 32, the auxiliary power supply 33, a driver circuit section 34, and an auxiliary energy requirement determiner 35.

In the present embodiment, an energy storage coil 330 and an energy storage capacitor 331 are provided as the auxiliary power supply 33. A charging driver 340 for opening and closing the charging switch 31 and a discharging driver 341 for opening and closing the discharging switch 32 are provided in the driver circuit section 34.

A semiconductor switching element such as an IGBT that is a MOS gate structure transistor (IGBT stands for Insulated Gate Bipolar Transistor) or the like is used as the ignition switch 30.

The ignition switch 30 has a control terminal for ignition 30G (gate), a power supply side terminal for ignition 30C (collector), and a ground side terminal for ignition 30E (emitter).

The ignition switch 30 is configured to control by opening and closing conduction between the emitter-collector based on the ignition signal IGt inputted to the gate 30G.

In the present embodiment, the power supply side terminal for ignition 30C is connected to the low voltage side terminal 201 of the primary winding 20, and the ground side terminal for ignition 30E is grounded.

Moreover, a reflux diode 301 is interposed so as to bypass between the collector 30C and the emitter 30E of the ignition switch 30.

The reflux diode 301 is a rectifier element that allows a current flowing toward the collector 30C (power supply side) from the emitter 30E (ground side) and blocks the current flowing in the opposite direction provided between the collector 30C and the emitter 30E of the ignition switch 30.

A cathode of the reflux diode 301 is connected to the collector 30C of the ignition switch 30, and an anode thereof is connected to the emitter 30E.

The reflux diode 301 forms a reflux passage that allows a current flowing in a direction from the emitter to the collector of the ignition switch 30 when the ignition switch 30 is turned off and the conduction between the emitter-collector is cut off, and it is possible to allow current to flow in a direction from the ground side terminal 201 to the non-ground side terminal 200 in the primary winding 20 of the ignition coil 2.

A semiconductor switching elements such as IGBT that is the MOS gate structure transistor is used for the charging switch 31.

The charging switch 31 has a control terminal for charging 31G (gate), a power supply side terminal for charging 31C (collector), and a ground side terminal for charging 31E (emitter). The charging switch 31 is configured to control charging by opening and closing conduction between the emitter-collector, based on a charging control signal VG31 inputted to the gate 31G from the charging driver 340.

In the present embodiment, the collector 31C of the charging switch 31 is connected to a drain 32D of the discharging switch 32 via a diode 332.

An anode of the diodes 332 is connected to the collector 31C of the charging switch 31 so as to allow a current flowing in a direction towards the drain 32D of the discharging switch 32 from the collector 31C of the charging switch 31. In addition, the emitter 31E side of the charging switch 31 is grounded.

A semiconductor switching element, such as a MOSFET (MOSFET stands for Metal Oxide Semiconductor Field Effect Transistor) or the like is used for the discharging switch 32.

The discharging switch 32 has a control terminal for discharging 32G (gate), a power supply side terminal for discharging 32D (drain), and a ground side terminal for discharging 32S (source). The discharging switch 32 is configured to control by opening and closing conduction between the gate-source based on a discharging control signal VG32 inputted to the control terminal for discharging 32G from the discharging driver 341.

Although using an n-channel MOSFET as the discharging switch 32 is shown as an example in the present embodiment, it is not limited so. So-called power transistor may be appropriately employed. It is the same in the ignition switch 30 and the charging switch 31.

In the present embodiment, the source 32S of the discharging switch 32 is connected to the low-voltage side terminal 201 of the primary winding 20 via a diode 333. An anode of the diode 333 is connected to the source 32S of the discharging switch 32 so as to allow a current flowing in a direction from the source 32S side of the discharging switch 32 toward the low-voltage side terminal 201 side of the primary winding 20.

The auxiliary power supply 33 in the present embodiment is configured by the energy storage coil 330, the energy storage capacitor 331, and the diode 332.

The diode 332 rectifies a current flowing from the energy storage coil 330 to the energy storage capacitor 331, and prevents the current from flowing back into the energy storing coil 330 when discharged from the energy storage capacitor 331.

The energy storage coil 330 is an inductor that is provided so as to accumulate electromagnetic energy by the charging switch 31 being turned on. A power supply side terminal 330V which is a first end of the energy storage coil 330 is connected to the non-ground side output terminal of the DC power supply 5 (the positive terminal), and a ground side terminal 330G which is a second end is connected to the power supply side terminal for charging 31C in the charging switch 31.

Further, the energy storage capacitor 331 is provided between the diode 332 that is interposed between the collector 31C of the charging switch 31 and the drain 32D of the discharging switch 32 so as to be parallel with the charging switch 31, and a non-ground side terminal 331V of the energy storage capacitor 331 is connected to the cathode of the diode 332, while a ground-side terminal 331G is grounded.

The energy storage capacitor 331 is a capacitor for storing the energy discharged from the energy storage coil 330.

The driver circuit section 34 of the present embodiment is composed of the charging driver 340 that opens and closes the charging switch 31 and the discharging driver 341 that opens and closes the discharging switch 32.

It should be noted that although no driver circuit section is provided with the ignition switch 30 because it can be driven directly by the ignition signal IGt transmitted from the ECU 4 according to the operating condition of the engine 7, a driver circuit section that transmits an ignition control signal $VG_{30}$ according to the ignition signal IGt similarly to the charging switch 31 may be provided.

The charging driver 340 generates a charge driving signal $VG_{31}$ made of a high-frequency pulses switched Hi-Lo in a predetermined cycle by receiving the ignition signal IGt oscillated from the ECU 4 in accordance with the operating conditions of the engine 7, and opens and closes the charging switch 31.

In addition, the opening and closing of the charging switch 31 is prohibited when the ignition signal IGt rises from ECU 4 delayed by a predetermined delay time T (a few µs~tens of µs) from a falling of the ignition signal IGt, when the discharge period signal IGw that falls after a discharge period Tw elapsed is transmitted, and when the discharge period signal IGw is turned on.

In the present embodiment, the opening and closing of the driver 340 is started synchronizing with the rising of the ignition signal IGt, the opening and closing of the driver 340 is stopped synchronizing with the falling of the ignition signal IGt, and the energy storage capacitor 331 is charged during the ignition signal IGt is turned on.

However, it is not limited that the charging of the energy storage capacitor 331 must be performed during a period that the ignition signal IGt is turned on, but the charging may be performed during periods other than a period that the discharge period signal IGw is turned on.

Moreover, the auxiliary power supply 33 in the present embodiment constitutes so-called step-up Dc-Dc converter together with the charging switch 31, repeats charging and discharging of the energy storage coil 330 by opening and closing the charging switch 31, and charges the energy storage capacitor 331 in a superposed manner while boosting a discharging voltage Vdc (may be referred to as a charging voltage).

The energy storage capacitor 331 is charged to a voltage higher (e.g., 50V~several hundred V) than the power supply voltage (e.g., 12V~24V).

The discharging driver 341 has a gate voltage that can open and close the discharging switch 32, and generates a discharging control signal $VG_{32}$ made of a high-frequency pulses switched to Hi-Lo in a predetermined opening and closing cycles.

The ignition signal IGt, the discharge period signal IGw, a primary voltage determination signal JDG1, and a secondary current determination signal JDG2 are inputted to the discharging driver 341.

Since the auxiliary power supply 33 enhances the primary current I1 flowing through the primary winding 20 and generates an induced electromotive force higher than a discharge maintaining voltage in the secondary current by switching the discharging and stopping the discharging from energy storage capacitor 331 by opening and closing the discharging switch 32, the secondary current I2 is enhanced, and it is possible to generate a discharge maintaining current in order to maintain the discharge in the secondary winding 21 so that blow-off is prevented from occurring. Further, as in the present invention, by charging the energy from the ground side terminal 201 of the primary winding 20, it is possible to charge the electromagnetic energy at a lower voltage than when charging from the secondary winding 21 side.

In addition, when a voltage higher than the battery voltage is charged from the high-voltage side of the primary winding 20 during the ignition switch 30 is turned on, efficiency is deteriorated due to a current flowing into the battery, etc.

Therefore, according to the present invention, there is an excellent effect that it is possible to charge the energy most easily and efficiently.

In the present embodiment, in order to adequately control the discharge from the auxiliary power supply 33, a primary voltage determiner 350 and a secondary current determiner 351 are provided as the auxiliary energy requirement determiner 35 in the control circuit section 3, and feedbacks respective results of the determination to the discharging driver 341.

The auxiliary energy requirement determiner 35 in the present embodiment is constituted by the primary voltage determiner 350, the secondary current determiner 351, and a secondary current detector 352.

In the present invention, the voltage V1 at the ground side terminal 201 of the primary winding 20 of the ignition coil 2 is monitored by the primary voltage determiner 350 at a timing of after the fall of the ignition signal IGt and before the rise of the discharge period signal IGw.

The primary voltage determiner 350 determines a start of charging the discharge energy by detecting the voltage at the ground side terminal 201 of the primary winding 20 of the ignition coil 2 as the primary voltage V1, comparing a result thereof with a predetermined threshold voltage V1$th$ to perform a threshold-determination, and inputting a result thereof as the primary voltage determination signal JDG1 to the discharging driver 341.

Furthermore, the secondary current determiner 351 is configured so as to stabilize the discharge current by comparing the secondary current I2 detected by the secondary current detector 352 for detecting the secondary current I2 with a predetermined secondary current upper threshold I2$th$H and a secondary current lower threshold I2$th$L, and feedbacks the result to the discharging driver 341 as the secondary current determination signal JDG2.

When the ignition signal IGt is turned off, the discharge period signal IGw is turned on, and the primary voltage determination signal JDG1 is turned on, the discharging driver 341 starts the opening and closing of the discharging switch 32 to switch the opening and closing of the discharging switch 32 following the on/off of the secondary current determination signal JDG2 to control the discharge from the auxiliary power supply 33 to the ground side terminal 201 of the primary winding 20 of the ignition coil 2.

That is, according to the present invention, the discharging from the auxiliary power supply 33 is not started uniformly by the discharge period signal IGw, but only when it is determined necessary to discharge from the auxiliary power supply 33 by the primary voltage determiner 350, the discharging is permitted, and it is possible to suppress the electrode wear due to the excessive energy charge.

Furthermore, it becomes possible to control the discharge from the auxiliary power supply 33 so that the discharge current I2 is within the predetermined range by the secondary current determiner 351 regardless of the magnitude of the secondary voltage V2.

EXAMPLE 1

An operation of the ignition system 6 will be described with reference to FIG. 3.

Figure 3:
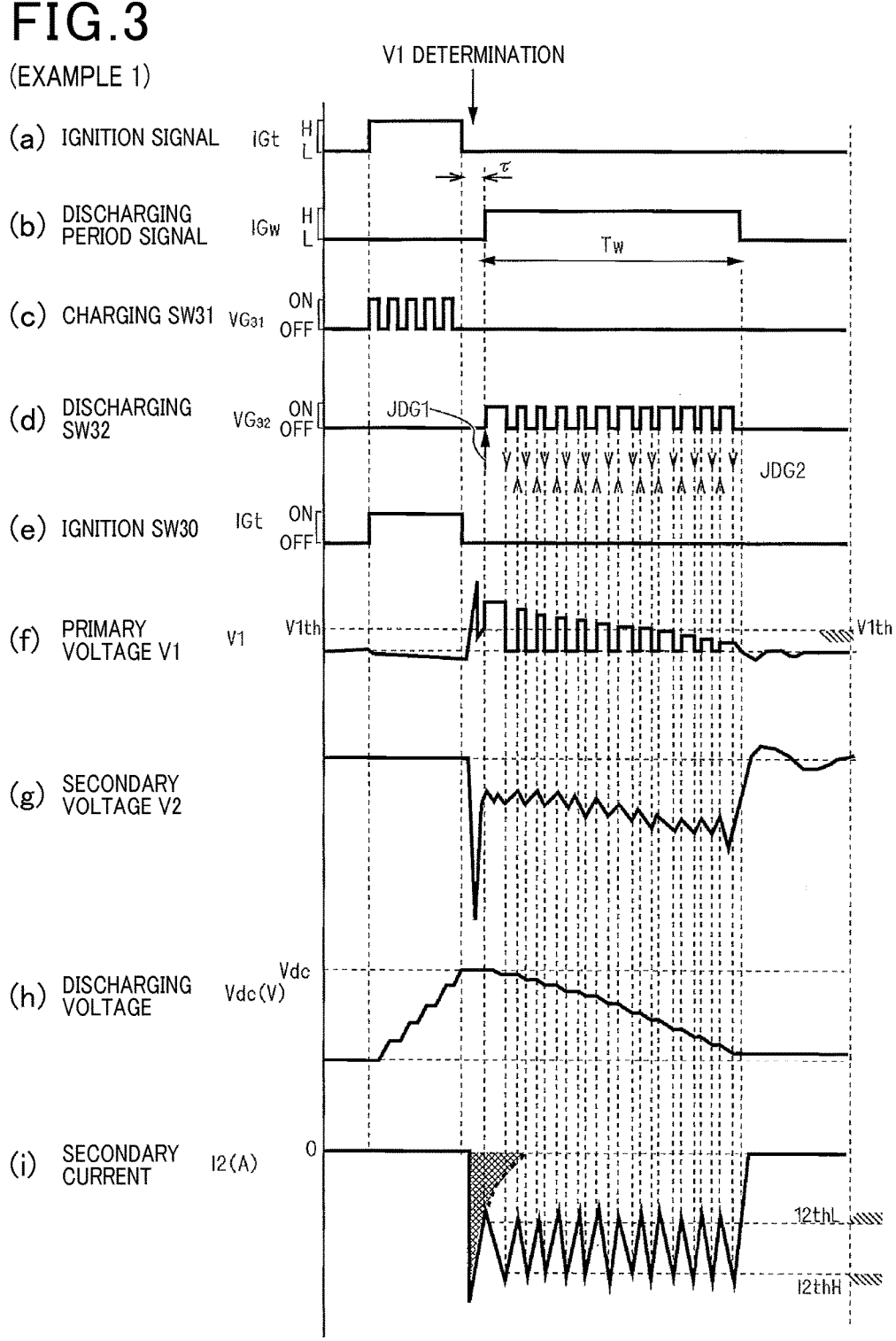
FIG. 3 shows a timing chart of an operation of the ignition system in FIG. 2.

As shown in FIG. 3($a$), the ignition signal IGt that switches Hi-Lo at a specified timing by the ECU 4 in accordance with the operating condition of the engine 7 is transmitted.

Further, as shown in FIG. 3($b$), the discharge period signal IGw that rises delaying a predetermined delay time T after the fall of the ignition signal IGt and controls to maintain the discharging during a predetermined discharge period Tw is transmitted from the ECU 4.

In the present embodiment, as shown in FIG. 3($c$), the charging control signal $VG_{31}$ that turns on and off with a predetermined period is generated synchronizing with the rise of the ignition signal IGt, and it turns the charging switch 31 on and off.

If the charging switch 31 is turned on when the discharging switch 32 is turned off, a current flows to the energy storage coil 330 from the DC power supply 5, and the energy storage coil 330 is charged.

If the charging switch 31 is turned off when the discharging switch 32 is turned off, the electromagnetic energy stored in the energy storage coil 330 flows to the energy storage capacitor 331 side via the diode 332, and the energy storage capacitor 331 is charged.

If the opening and closing of the charging switch 31 is repeated when the discharging switch 32 is turned off, the charging of energy storage coil 330 and the discharging from the energy storage coil 330 to the energy storage capacitor 331 are repeated in a superposed manner, and as shown in FIG. 3($h$), a high discharging voltage Vdc with much higher than the voltage of the DC power supply 5 is charged to the energy storage capacitor 331, thus it is possible to accumulate the electromagnetic energy.

It should be noted that although a configuration of charging the energy storage capacitor 331 while the ignition signal IGt is turned on is shown in the present embodiment, it is not necessarily needed to charge the energy storage capacitor 331 synchronously with the ignition signal IGt.

As long as the energy required to maintain the discharge for a predetermined discharge period can be stored, the energy storage capacitor 331 may be charged at any time except the period when the discharge period signal IGw is turned on.

Meanwhile, synchronizing with the switching on and off of the ignition signal IGt, the ignition switch 30 is turned on and off as shown in FIG. 3($e$).

When the primary current I1 flowing through the primary winding 20 of the ignition coil 2 is cut off by the switching on and off of the ignition switch 30, a high primary voltage V1$r$ occurs in the primary winding 20 as shown in FIG. 3($f$), and further, a very high secondary voltage V2 that is proportional to the winding ratio (N=N2/N1) of the primary voltage V1 is generated to the secondary winding 21 side as shown in FIG. 3(g).

When this secondary voltage V2 is applied to the spark plug 1, and a dielectric breakdown occurs to form a discharge path between a plug gap, a large secondary current I2 as indicated by hatching in FIG. 3(i) flows, and the spark discharge is generated in the spark plug 1 until the stored magnetic energy is finished discharging (until I2 is 0A) by turning the ignition switch 30 on.

As shown in FIG. 3(a), in a period from the fall of the ignition signal IGt to the rise of the discharge period signal IGw, a determination of the primary voltage V1 is performed by the primary voltage determiner 350.

At this time, both the ignition switch 30 and the discharging switch 32 are turned off.

Furthermore, the secondary voltage V2 between the non-plug-side terminal 210 and the plug-side terminal 211 of the secondary winding 21 of the ignition coil 2 varies depending on an actual discharging distance of the spark discharge occurring in the spark plug 1.

When a discharge arc is stretched by a strong air current in the cylinder 201, the discharging distance becomes longer, thus the secondary voltage V2 of the secondary winding 21 increases to that extent.

The primary voltage V1 detected at the ground side terminal 201 of the primary winding 20 changes in proportion to the change of the secondary voltage V2 by an induction effect of the ignition coil 2.

Therefore, by detecting the primary voltage V1, it is possible to predict the secondary voltage V2 that varies depending on the air flow flowing inside the cylinder 201.

When determined that the stretching of the discharge arc does is not occurring, the discharge from the auxiliary power supply 33 is stopped, or a discharge start timing is delayed, and when determined that blow-off is likely to occur due to the stretching of the discharge arc, it is possible to start the discharge from the auxiliary power supply 33 at an early stage.

The primary voltage V1 is compared with a predetermined primary voltage threshold V1th by the primary voltage determiner 350, and when the primary voltage V1 exceeds the primary threshold voltage V1$th$, it is determined conditions likely to cause the stretching of the discharge are occurring, and the primary voltage determination signal JDG1 is turned on.

On the other hand, as shown in FIG. 3(b), since the discharge period signal IGw rises delayed by a certain delay time T from the falling of the ignition signal IGt, and its rising timing varies in response to the operating conditions, it is possible to start the discharge from the auxiliary power supply 33 in response to the changes in operating conditions by correcting the discharge period signal IGw with the primary determination signal JDG1.

The ignition signal IGt, the discharge period signal IGw, and the primary voltage determination signal JDG1 are inputted to the discharge control driver 341, and as shown in FIG. 3(d), the discharging control signal is $VG_{32}$ output so that the discharging switch 32 is opened and closed.

Then, the charging switch 31 is in the OFF state, and by the opening and closing of the discharging switch 32, as shown in FIG. 3(h), the discharge of the energy storage capacitor 331 occurs, and it will be introduced from the ground side terminal 201 of the primary winding 20 of the ignition coil 2.

Thereby, the primary current I1 flowing through the primary winding 20 is increased, and as shown in FIG. 3(i), the secondary current is increased.

When the discharge is started from the auxiliary power supply 33, the secondary current I2 flowing through the secondary winding 21 of the ignition coil is detected by the secondary current detection resistor 352 provided in the secondary current determiner 351.

The secondary current I2 is voltage-converted by the secondary current detection resistor 352, and is inputted into the secondary current determiner 351 as a secondary current converted voltage VI2.

In the secondary current determiner 351 compares the two thresholds consisting of a predetermined secondary current upper threshold I2$th$H and a secondary current lower threshold I2$th$L and the secondary current I2, and outputs the secondary current determination signal JDG2.

When the secondary current I2 is higher than the secondary current upper threshold I2$th$H, it is determined that the discharge from the auxiliary power supply 33 is unnecessary, and when the secondary current I2 is less than the secondary current lower threshold I2$th$L, it is determined that the discharge from the auxiliary power supply 33 is necessary, and as shown in FIG. 3(d), the secondary current determination signal JDG2 is switched on and off and inputted to the discharging driver 341, thus the on and off of the discharging switch 32 is switched.

As a result, regardless of the change in the secondary voltage V2, as shown in FIG. 3(i), it becomes possible to control the secondary current I2 to be in a certain range.

In the ignition system 6 of the present invention, the electrode is suppressed from wearing due to the excess energy charge by delaying the discharge from the auxiliary power supply 33 under a condition where blow-off hardly occurs, while the discharge from the auxiliary power supply 33 is started promptly and the discharge is maintained by charging energy from the ground side terminal 201 of the primary winding 20 of the ignition coil 2 so that blow-off is prevented from occurring under a condition where blow-off would be likely to occur.

Furthermore, by switching the discharging and the stop discharging from the auxiliary power supply 33 by threshold-determining the change of the secondary current I2 (VI2) detected by the secondary current detector 352, it is possible to maintain the secondary current I2 to be in a certain range regardless of the change of the secondary voltage V2.

It should be noted that after the discharge has started from the auxiliary power supply 33, the primary voltage V1 is grounded and becomes 0 when the discharging switch 32 is turned off, and the discharging voltage Vdc of the energy storage capacitors 331 is detected when the discharging switch 32 is turned on.

<Second Embodiment>

Figure 4:
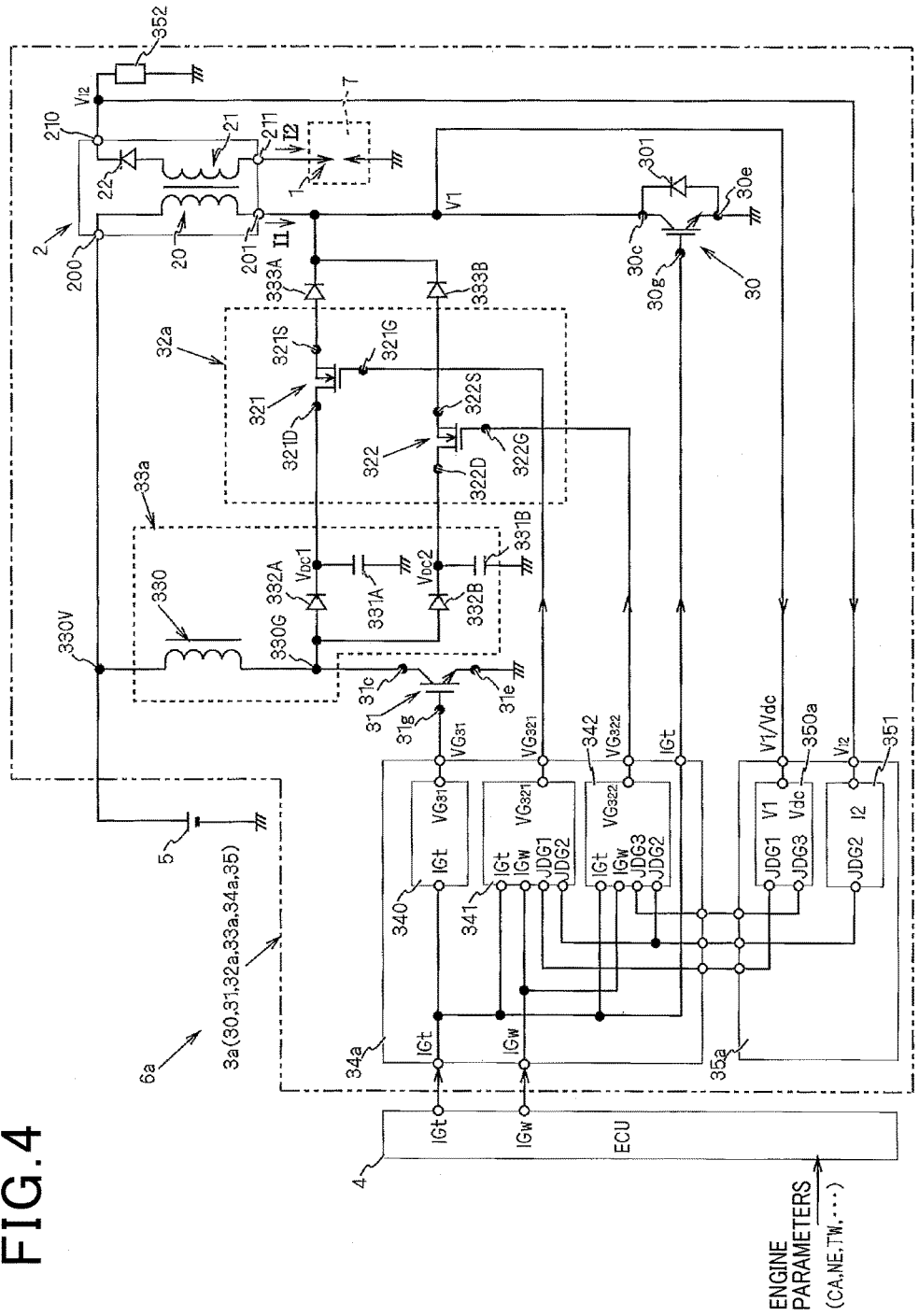
FIG. 4 shows an outline of a circuit diagram of an ignition system according to a second embodiment of the present invention.

An ignition system 6a according to a second embodiment will be described with reference to FIG. 4.

In the following embodiment, the same reference numerals are denoted to the same structure as the above embodiments, and branch numbers of the alphabet are denoted to portions that are different, thus descriptions of the common portions will be omitted, and feature portions in the embodiments will mainly be described. This also applies to other embodiments.

In the ignition system 6a in the present embodiment, a control circuit section 3a is composed of the ignition switch 30, the charging switch 31, a discharging switch 32a, an auxiliary power supply 33a, a driver circuit section 34a, and an auxiliary energy requirement determiner 35a.

The auxiliary power supply 33a is provided with first and second energy storage capacitors 331A, 331B for a single energy storage coil 330.

Further, the first and second discharging switches 321 and 322 are provided to the first and second energy storage capacitors 331A, 331B, respectively, as the discharging switch 32a, and a point that providing a first diode 332A, a second diode 332B, a third diode 333A, and a fourth diode 333B as necessary is different from the previous embodiment.

Furthermore, the driver circuit section 34a is composed of the charging driver 340 that opens and closes the charging switch 31, and a first and second discharging driver 341, 342 that open and close the first and the second discharging switches 321, 322, respectively.

Moreover, as in the previous embodiment, an ignition control driver for opening and closing the ignition switch 30 may be provided.

The ignition signals IGt, IGw, the primary voltage determination signal JDG1 and the secondary current determination signal JDG2 are inputted to the first, and second discharging drivers 341, 342.

Although the discharge start timing is determined by threshold-determining the primary voltage V1 in the above-mentioned embodiment, the switching of the first and second energy storage capacitors 331A, 332A is additionally performed in the present embodiment.

As described above, during the delay time T from the fall of the ignition signal IGt to the rising of the discharge period signal IGw, the primary voltage V1 and the secondary voltage V2 are proportional to the winding ratio (N=N2/N1) between the primary number of turns N1 of the primary winding 20 and the secondary number of turns N2 of the secondary winding 21, and a relationship of N=N2/N1=V2/V1 is satisfied so that it becomes possible to predict the secondary voltage V2 by detecting the primary voltage V1 during the delay time T.

Meanwhile, after the discharge has started, the primary voltage V1 is equal to a first discharging voltage Vdc1 of the first energy storage capacitor 331A when the first discharging switch 321 is turned on, and the primary voltage V1 is equal to a second discharging voltage Vdc2 of the second energy storage capacitor 331A when the second discharging switch 322 is turned on.

Therefore, by detecting the primary voltage V1, it is possible to monitor the remaining energy amount of the auxiliary power supply 33a.

When the discharge from the first energy storage capacitor 331 is started based on the determination result of the primary voltage V1 similarly to the above-mentioned embodiment, and the first discharging voltage Vdc1 becomes lower than a predetermined discharging voltage threshold Vdc1th after the discharge from the first energy storage capacitor 331 is performed so that the secondary current I2 is in a certain range by the determination result of the secondary current I2, it is possible to switch the discharging from the second energy storage capacitor 332 by stopping driving the first discharging driver and starting driving the second discharging driver.

Moreover, in the determination of the primary voltage V1, it also becomes possible not to perform the discharge from the second energy storage capacitor 332 when it is determined that inside the cylinder 701 is in a condition where blow-off is unlikely to occur.

EXAMPLE 2

A basic operation and effect of the ignition system 6a shown as an example 2 in the second embodiment of the present invention will be described with reference to FIGS. 5 and 6A.

In FIG. 5, (a) shows the ignition signal IGt, (b) shows the discharge period signal IGw, (c) shows an open/close state of the charging switch 31, (d) shows an open/close state of the first discharging switch 321, (e) shows an open/close state of the second discharging switch 322, (f) shows an open/close state of the ignition switch 30, (g) shows the change of the first discharging voltage Vdc1, (h) shows the change of the second discharging voltage Vdc2, (i) shows a cumulative amount of the charged energy E, (j) shows the change of the primary voltage V1, (k) shows the change of the secondary voltage V2, and (L) shows the change of the secondary current I2.

As shown in FIG. 5(a), the ignition signal IGt according to the ignition timing of the engine is transmitted from the ECU 4.

As shown in FIG. 5(b), the discharge period signal IGw that is set in advance according to the operating conditions of the engine is transmitted from the ECU 4.

As shown in FIG. 5(c), the charging switch 31 is turned on and off synchronizing with the rise of the ignition signal IGt, and the driving of the charging switch 31 is stopped synchronizing with the fall thereof.

As shown in FIG. 5(g), the electromagnetic energy discharged from the energy storage coil 330 is charged to the first energy storage capacitor 331A in a superposed manner by opening and closing the charging switch 31, and thus the first discharging voltage Vdc1 of the first energy storage capacitor 331A rises.

At the same time, as shown in FIG. 5(h), the electromagnetic energy discharged from the energy storage coil 330 is charged to the second energy storage capacitor 331B in a superposed manner by opening and closing the charging switch 31, and thus the second discharging voltage Vdcw of the second energy storage capacitor 331B rises.

Incidentally, at the end of the charging, the first discharging voltage Vdc1 and the second discharging voltage Vdc2 become an equal voltage Vdc (for example, 100V).

As shown in FIG. 5(f), the ignition switch 30 is turned on synchronizing with the rise of the ignition signal IGt, and the ignition switch 30 is turned off synchronizing with the fall of the ignition signal IGt.

As shown in FIG. 5(i), a high energy is charged at once by the cut-off of the ignition switch 30.

As a result, as shown in FIG. 5(j), the primary voltage V1 of the primary winding 20 rapidly increases by the sudden change of the primary current I1 flowing through the primary winding 20 of the ignition coil 2 caused by the ignition switch 30 being turned off.

As shown in FIG. 5(k), a very high secondary voltage V2 is generated in the secondary winding 21 by the abrupt change in the current flowing through the primary winding 20 of the ignition coil 2, and insulation of a space formed between the electrodes of the spark plug 7 breaks down, thus discharge occurs.

At this time, as shown in FIG. 5(L), a large secondary current I2 flows.

On the other hand, the discharge period signal IGw rises immediately after the discharge has started, as shown in FIG. 5(b).

Then, as shown in FIG. 5(d), the discharging switch 321 is opened and closed synchronizing with the rise of the discharge period signal IGw.

As shown in FIG. 5(g), the first discharging voltage Vdc1 changes due the opening and closing of the discharging switch 321 wheile the charging switch 31 and the ignition switch 30 are turned off.

A current generated at that time flows through the primary winding 20, and is charged as a discharge maintaining energy as shown in FIG. 5(i), and the secondary current I2 is suppressed from dropping so as to maintain the discharge between the electrodes of the spark plug 1 as shown in FIG. 5 (L).

As shown in FIG. 5(j), although the primary voltage V1 drops at once by the discharge start, a resistance in a discharge space gradually increases in accordance with the stretching of the discharge by the air flow, and when it exceeds a predetermined discharging voltage threshold Vdc1$th$, the discharge current becomes difficult to flow; however, in order to start discharging from the second energy storage capacitor 331B by a determination signal JDG3 output from the primary voltage determiner 350a, the second discharge switch 322 is opened and closed, as shown in FIG. 5(e).

The second discharging voltage Vdc2 changes by the opening and closing of the second discharging switch 322, as shown in FIG. 5(h).

Therefore, the charging energy E increases by driving the first energy storage capacitor 331A and the second energy storage capacitor 331B in a superposed manner, as shown in FIG. 5(i), thus the primary voltage V1 is suppressed from rising and blow-off is suppressed from occurring, as shown in FIG. 5(j).

In addition, although a discharge period Tw1 is stored in a map set in advance and becomes a period of time that is selected according to the driving conditions, the start timing of the discharge from the first energy storage capacitor 331A is set to the appropriate timing according to the actual operating conditions by the primary voltage determination signal JDG1 that threshold-determines the primary voltage V1 by the primary voltage determiner 350a during the delay time T. The second discharge period Tw2 in which the maintaining energy from the second energy storage capacitor 331B is increased or decreased with a timing at which actually detected Vdc1 becomes less than the discharging voltage threshold Vdc1$th$ by comparing the first discharging voltage Vdc1 and the predetermined discharging voltage threshold Vdc1$th$ detected by the primary voltage determiner 350a after the discharging has started.

Furthermore, similarly to the above-mentioned embodiment, after the discharge from the auxiliary power supply 33a is started, the secondary current I2 is detect by the secondary current detector 352, the secondary current I2 is threshold-determined by the secondary current determiner 351 and an output of the secondary current determination signal JDG2 is switched so that the secondary current I2 becomes in a certain range, and discharging control signals VG321, VG322 outputted from the first and the second discharging drivers 341, 342 are switched to high and low.

Thereby, the secondary current I2 can be maintained at a constant value and within the certain range even when the secondary voltage V2 changes due to the change of the airflow flowing in the cylinder 201.

Thus, the energy necessary for maintaining the discharging is supplied in the correct proportion in the ignition system 6 of the present invention.

In the present invention, the ratio V1/V2 between the primary voltage V1 and the secondary voltage V2 generated in the secondary winding 21 of the primary winding 20 of the ignition coil 2 is approximately equal to the ratio N1/N2 between the primary number of turns N1 of the primary winding 20 and the secondary number of turns N2 of the secondary winding 21, and by monitoring the primary voltage V1, the change of secondary voltage V2 due to differences in individual differences is predicted, and thus it becomes possible to implement an ignition control delicately corresponding not only to the changes in the operating conditions, but the influence of individual differences.

As a result, as shown as a second embodiment in FIG. 7A, since the discharge arc ARK is never stretched even when there in only a breakdown discharge from the auxiliary power supply 33 and the discharge from the first energy storage capacitor 331A when the air flow in a combustion chamber is weak, the primary voltage V1 after the breakdown discharge increases slowly, and the supply of energy from the second energy storage capacitor 331B is delayed so that it is possible to have stable ignition even if the discharging is only performed for a short period of time.

EXAMPLE 3

Furthermore, as an example 3 in FIG. 7B, effects of the present invention in a case where a strong cylinder air flow occurs in the combustion chamber will be described.

Incidentally, the same operations as in example 2 are omitted, and only particular feature points will be described.

When a strong air flow occurs in the combustion chamber, since the discharge arc ARK is stretched, the secondary voltage V2 rises early, as shown in FIG. 7B.

In this case, since there is a correlation between the change in the secondary voltage V2 and the change in the primary voltage V1, the change in the secondary voltage V2 can be predicted by monitoring the primary voltage V1 with the primary voltage determiner 350a during the delay time T.

Therefore, when the V1 exceeds the predetermined primary threshold voltage V1th early, the opening and closing of the second discharging switch 322 is started promptly, the energy charge is performed selectively from a capacitor with higher energy among the first energy storage capacitor 331A and the second energy storage capacitor 331B.

As a result, as shown in FIG. 7B, energy sufficient enough to maintain the secondary current I2 is charged, thus stable ignition can be realized without causing blow-off.

COMPARATIVE EXAMPLE 1

Problems of a Comparative Example 1 will be described with reference to FIG. 6A and FIG. 8A.

In order to clarify the problems of an ignition system that performs a conventional multiple discharge, the Comparative Example 1 shows, as shown in FIG. 6A (d) and FIG. 6A (e), a result of the discharge not only from the first energy storage capacitor 331A, but from the second energy storage capacitor 331B being performed for a constant opening and closing cycle immediately after the discharge start in the ignition system 9 of the present invention, in a condition where the monitored result of the primary voltage V1 is not fed back, and a strong air flow in the combustion chamber is not occurring.

As a result, in the Comparative Example 1, as shown in FIG. 6A (i), the charged energy is supplied excessively, and as shown in FIG. 8A, a strong discharge arc continues to be maintained, and it becomes clear that this causes the electrode wear of the spark plug 1.

Further, when the power supply voltage is monitored and the voltage applied to the spark plug is averaged as in the conventional ignition system, although the effect to achieve maintaining the discharge can be exhibited in a situation where maintaining the discharge is difficult, it will cause the electrode wear due to excessive energy supply in an operating condition where an ignition is easily performed.

COMPARATIVE EXAMPLE 2

Problems of a Comparative Example 2 will be described with reference to FIG. 6B and FIG. 8B.

Figure 6B:
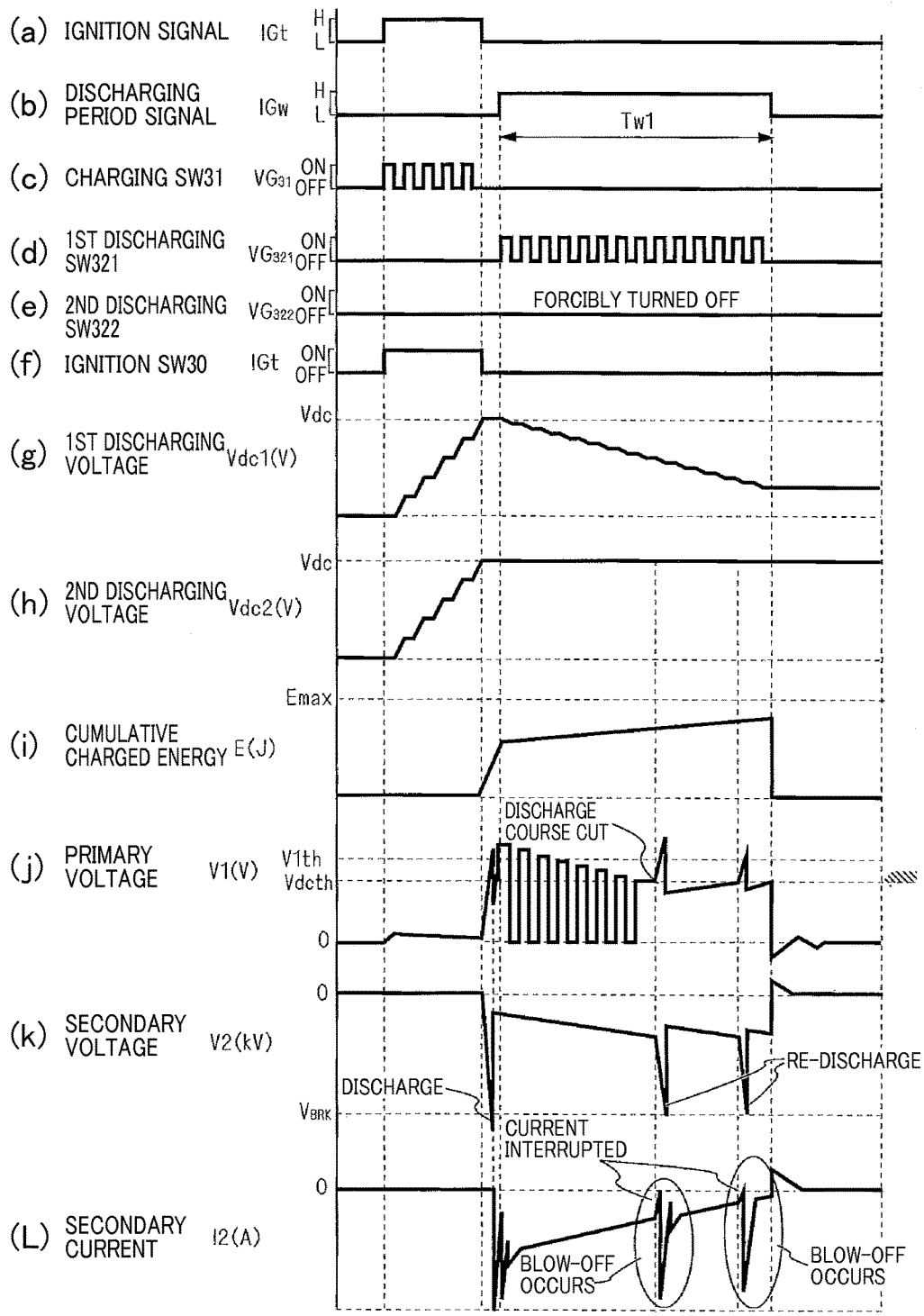
FIG. 6A shows a timing chart in a case where problems of an over-discharging in a conventional ignition system are reproduced as a comparative example 1.

In order to clarify the problems of the conventional ignition system, as shown in FIG. 6B (d) and FIG. 6B (e), the Comparative Example 2 shows a result of an ignition test in the ignition system 6 of the present invention in a state where the discharge from the second energy storage capacitor 331B is forcibly stopped, and under a condition where a strongly cylinder air flow occurs in the combustion chamber.

In the Comparative Example 2, the primary voltage determining signal JDG1 and the discharging voltage determination signal JDG3 are forcibly turned off, and after the discharge has started, the secondary current determination signal JDG2 is not fed back, the discharging switch 321 is opened and closed by a constant opening and closing cycle, and monitoring results of the primary voltage V1 of the ignition coil 2, the first discharging voltage Vdc1, and the secondary current I2 are not fed back.

As a result, in the Comparative Example 2, the spark discharge is generated in the spark plug 1 in accordance with the ignition signal IGt, and it is possible to achieve some degree of maintaining the discharge by the discharge from the auxiliary power supply 33a.

However, in the Comparative Example 2, since the discharge from the second energy storage capacitor 331B is stopped, the discharge arc ARK is stretched, as shown in FIG. 8B, when a strong air flow occurs in the combustion chamber, thus the secondary voltage V2 rises early, and it becomes difficult to maintain the discharge, causing the discharge arc to be torn off, and as shown in FIG. 6B (j), FIG. 6 (k), and FIG. 6 (L), blow-off of the discharge and a re-discharge occur.

At this time, the secondary current I2 does not flow momentarily, and causes a state as if a switching is performed, thus the re-discharge occurs.

Accordingly, the discharging energy supplied from the first energy storage capacitor 331A will not be supplied continuously to the same gas mixture, and it will be used for the dielectric breakdown in the discharge space, thus a flame will not grow sufficiently, a flame kernel FLK is blown off, and there is a risk of leading to misfire.

<Modifications>

First and second modifications 6b, 6c of the ignition system according to the second embodiment of the present invention will be described with reference to FIG. 9A and FIG. 9B.

In the ignition system 6a of the above-mentioned embodiment, a structure that the first energy storage capacitor 331A and the second energy storage capacitor 331B are connected to the first and second diodes 332A, 332B, respectively, and the first and second discharging switches 321, 322 are connected to the third and fourth diodes 333A, 333B, respectively, is shown. However, in the ignition system 6b of the first modification, as shown in FIG. 9A, the first diode 332A is shared by the first energy storage capacitor 331A and the second energy storage capacitor 331B, and in the ignition system 6c of the second modification, the third diode 333A is further shared by the first discharging switch 321 and the second discharging switch 322.

Accordingly, since an amount of current flowing into each element becomes larger due to the first and second energy storage capacitors 331A, 331B and the first and second discharging switches 321 and 322 serving as the first and third diodes 332A, 333A, although capacity required for each element becomes larger than the ignition system 6a in the above-mentioned embodiment, it is possible to reduce the number of parts while the same effects as the above-mentioned embodiment can be achieved.

In the present embodiment, a configuration that the discharge period signal IGw is also transmitted to the second discharging driver 342, and the discharge from the second energy storage capacitor 331B is started when all of the discharge period signal IGw, the primary voltage determining signal JDG1, and the discharging voltage determination signal JDG3 are turned on is shown. However, in the ignition system 6b of the first modification, the driving of the second discharging driver 342 may be started without transmitting the discharge period signal IGw to the second discharging driver 342, and only by the first discharging voltage determination signal JDG3.

Even with such a configuration, the same effects as the above-mentioned embodiment can be achieved.

Further, although an example of controlling the discharge in the superposed manner from the first energy storage capacitor 331A and the second energy storage capacitor 331B is shown in the present embodiment, the discharge may be performed only from either one of them.

Furthermore, in addition to the second energy storage capacitor 331B, the second discharging switch 322, and the diodes as necessary components, third and fourth energy storage capacitors 331C, 331D, third and fourth discharging switches 323, 324, and diodes as necessary components, all of which are made of the same configurations as the above mentioned capacitors and diodes, and may be provided in parallel therewith. Although the number of parts is increased, since it is possible to reduce the capacity of each element, it might be able to reduce the total cost, and it becomes possible to better control the power supply.

Although an example of connecting a plurality of auxiliary power supplies 33 in the downstream side of the primary winding 20 of the ignition coil 2 is shown in the above embodiments, they may be provided in the upstream side. However, in that case, it is necessary to consider polarities of rectifier elements or switching elements.

Further, although a step-up circuit is configured to be a common circuit, it may be provided in each auxiliary power supply.

Furthermore, although an example that the ignition signal IGt and the discharge period signal IGw use the signal from the ECU 4 as it is was shown, a step-up operation time and an ignition coil time may be separated by providing a driver circuit section.

<Third Embodiment>

An ignition system 6d according to a third embodiment of the present invention will be described with reference to FIG. 10.

The ignition system 6d is composed of the spark plug 1, the ignition coil 2, a control circuit section 3d, an ECU 4d, and the DC power supply 5, and the control circuit section 3d is composed of the ignition switch 30, the charging switch 31, the discharging switch 32, an auxiliary power supply 33d, a driver circuit section 34d, and an auxiliary energy requirement determiner 35d.

With the same configuration as the first embodiment, the present embodiment is different from the first embodiment in points that only the energy storage coil 330 is provided as the auxiliary power supply 33d, the energy storage capacitor 331 is removed, and the auxiliary energy requirement determiner 35d is provided in the ECU 4d.

The driver circuit section 34d in the present embodiment is connected to the ECU 4 so as to receive the ignition signal IGt and the discharge period signal IGw outputted from the ECU 4.

In addition, the driver circuit section 34d is connected to the control terminal for ignition 30G, the control terminal for charging 31G, and the control terminal discharging for 32G so as to control the ignition switch 30, the charging switch 31, and the discharging switch 32. The driver circuit section 34d is provided so as to output the ignition signal IGt, the charging control signal $VG_{31}$, and the discharging control signal $VG_{32}$ to the control terminal for ignition 30G, the control terminal for charging 31G, and the control terminal for discharging 32G, respectively, based on the received ignition signal IGt and the discharge period signal IGw.

Furthermore, in the present embodiment, the auxiliary energy requirement determiner 35d is provided in the ECU 4d, the threshold-determination is performed for the primary voltage V1, the discharging voltage Vdc, and the secondary current I2, and the primary voltage determining signal JDG1, the secondary current determination signal JDG2, and the discharging voltage determination signal JDG3 are configured to be outputted from the ECU 4d to the driver circuit section 34d.

Moreover, in the present embodiment, since the energy storage capacitor 331 is removed, the energy storage coil 330 cannot be recharged only by the opening and closing of the discharging switch 32.

Therefore, the driver circuit section 34d is controlled so as to open and close the discharging switch 32 and the charging switch 31 alternately by the opening and closing of the ignition switch 30 after the discharging has started.

<Description of Operation>

Hereinafter, an operation (functions and effects) according to the configuration of the present embodiment will be described with reference to FIGS. 11A and 11B. In the timing charts of FIG. 11A and 11B, Vdc indicates a voltage of the drain 32D of the discharging switch 32, I1 indicates the primary current, and I2 indicates the secondary current, respectively.

It should be noted that in the drawings, and in the timing charts of the primary current I1 and the secondary current I2, it is assumed that a direction shown by an arrow in FIG. 10 is shown as a positive value. Moreover, similarly to other embodiments, the ignition signal IGt, the discharge period signal IGw, the ignition signal IGt ($VG_{30}$), the charging control signal $VG_{31}$, and the discharging control signal $VG_{32}$ are assumed to be in a state of H when rising upward in the drawing, and are in a state of L when falling downward.

The ECU 4d controls the operation of each section of the engine system 10 including the injector 78 and the control circuit section 3 in accordance with the engine parameters obtained based on the outputs of the various sensors 79, such as the rotational speed sensor 793. Here, further describing the ignition control, the ECU 4d generates the ignition signal IGt and the discharge period signal IGw based on the obtained engine parameters. Then, the ECU 4d outputs the generated ignition signal IGt and the discharge period signal IGw to the driver circuit section 34d. In addition, in the present embodiment, it is configured that the primary voltage V1, the discharging voltage Vdc, and the secondary current I2 are inputted to the ECU 4d, and the primary voltage determining signal JDG1, the discharging voltage determination signal JDG3, and the secondary current determination signal JDG2 respectively threshold-determined are outputted to the driver circuit section 34d.

It should be noted that in the present embodiment, the discharge period signal IGw is assumed to rise from an L level to an H level simultaneously with the ignition signal IGt falling from the H level to the L level.

When the driver circuit section 34d receives the ignition signal IGt and the discharge period signal IGw outputted from the ECU 4d, based on these signals, the ignition control signal VG30 for controlling switching on and off of the ignition switch 30, the charging control signal $VG_{31}$ for controlling switching on and off of the charging switch 31, and the discharging control signal $VG_{32}$ for controlling switching on and off of the discharging switch 32 are outputted.

In the present embodiment, the ignition control signal $VG_{30}$ is the same as the ignition signal IGt. Therefore, the driver circuit section 34d directly outputs the received ignition signal IGt as it is to the gate 30G of the ignition control signal VG30.

On the other hand, the charging control signal $VG_{31}$ and the discharging control signal $VG_{32}$ are generated based on the discharge period signal IGw, the primary voltage determination signal JDG1, the discharging voltage determination signal JDG3, and the secondary current determination signal JDG2 received from the ECU 4d. For this reason, the driver circuit section 34d outputs the charging control signal VG31 and the discharging control signal $VG_{32}$ towards the gate 31G of the charging switch 31 or the gate 32G of the discharging switch 32.

Here, in the present embodiment, upon determining whether or not to discharge from the auxiliary power supply 33d based on the determination result of the primary voltage determiner 350d, the charging control signal $VG_{31}$ is a square wave pulsed signal that rises to H level together with the discharge period signal IGw rises to H level, repeatedly rises at a predetermined cycle during the energy charge period signal IGw is in the H level, and on-duty ratio thereof is constant (1:1). Moreover, the discharging control signal $VG_{32}$ is a square wave pulsed signal that repeatedly rises alternating with the charging control signal $VG_{31}$ during the discharge period signal IGw is in the H level, and on-duty ratio thereof is constant (1:1).

That is, as shown in FIG. 11A, at the same time the charging control signal $VG_{31}$ falls from the H level to the L level, the discharging control signal $VG_{32}$ rises from the L level to the H level. In addition, at the same time the discharging control signal $VG_{32}$ falls from the H level to the L level, the charging control signal $VG_{31}$ rises from the L level to the H level.

With reference to the following FIG. 11A, when the ignition signal IGt rises to the H level at time t1, in response to this, the ignition control signal $VG_{30}$ rises to the H level so that the ignition switch 30 is turned on. At this time, since the discharge period signal IGw is in the L level, the charging switch 31 and the discharging switch 32 are turned off. As a result, the flowing of the primary current I1 in the primary winding 20 starts.

Thus, the ignition coil 2 is charged between time t1-t2 when the ignition signal IGt rises to the H level. Then, when the ignition switch 30 is turned off by the ignition signal IGt being fallen from the H level to the L level at time t2, the primary current that has flowed to the primary winding 20 until then is suddenly cut off. Then, the ignition coil 2 is discharged, and at the secondary winding 21, the discharge current that is a large secondary current I2 occurs. As a result, the ignition discharge is started at the spark plug 1.

Here, after the ignition discharge is started at time t2, in the conventional discharge control (or in an operating condition that energy charge period signal IGw is maintained at the L level without being raised to the H level), as indicated by a broken line, the discharge current is close to zero, and decays to the extent that it is not possible to maintain the discharge.

In this respect, in the present operation example, at the same time when the ignition signal IGt falls from the H level to the L level at time t2, the discharge period signal IGw rises from the L level to the H level. Then, first, while the discharging control signal $VG_{32}$ is being maintained at the L level, the charging control signal $VG_{31}$ rises to the H level. That is, in a condition where the discharging switch 32 is turned off, the charging switch 31 is turned on. As a result, the electromagnetic energy is stored in the energy storage coil 330.

Then, at the same time when the charging control signal $VG_{31}$ falls from the H level to the L level, the discharging control signal $VG_{32}$ is raised to the H level. At this time, at the same time the boost of the discharging voltage Vdc of the energy storage coil 330 due to the charging switch 31 is turned off, the discharging switch 32 is turned on. Then, the electromagnetic energy discharged from the energy storage coil 330 is supplied to the primary winding 20 from the low-voltage side terminal 201. Thus, the primary current caused by the charging energy flows during the ignition discharge.

Accordingly, when the primary current is supplied to the primary winding 20 from the energy storage coil 330, additional content associated with the supply of such primary current is superposed to the discharge current I2 that has been flowing through until then. Thus, the discharge current I2 is well secured to the extent capable of maintaining the spark discharge.

Such a storing of electromagnetic energy in the energy storage coil 330 and a superposing of the discharge current accompanying the supply of the primary current from the energy storage coil 330 are performed repeatedly until a time t4 when energy charge period signal IGw falls from the H level to the L level by the on-pulse of the charging control signal $VG_{31}$ and the on-pulse of the discharging control signal $VG_{32}$ being outputted alternatively.

That is, as shown in FIG. 11A, every time the pulse of the charging control signal VG31 rises, the electromagnetic energy is stored in the energy storage coil 330. Then, every time the pulse of the discharging control signal VG32 rises, the primary current I1 is sequentially increased by the input energy supplied from the energy storage coil 330, and in response to this, the discharge current I2 is sequentially increased.

Thus, in the configuration of the present embodiment, it is possible to satisfactorily maintain the discharge current so that the so-called blow-off does not occur. In the structure of the present embodiment, a capacitor is omitted in the conventional configuration disclosed in Japanese Patent Application Laid-Open Publication No. 2007-231927. Therefore, according to the present embodiment, so-called blow-off and accompanying ignition energy loss are favorably suppressed from occurring by an apparatus configuration simpler than conventional one.

Even in the present embodiment, the same effects as the above-mentioned embodiment can be achieved.

<Modifications>

Hereinafter, modifications of the present embodiment will be described. Parts of the above-described embodiments, and all or parts of a plurality of modifications may be appropriately applied compositely within a range that does not contradict technically.

In addition, for example, parts of functional blocks of the ECU 4d may be integrated with the driver circuit section 34d.

Alternatively, the driver circuit section 34d may be divided for each switching element.

In this case, when the ignition control signal $VG_{30}$ is the ignition signal IGt, the ignition signal IGt may be outputted directly to the gate 30G of the ignition switch 30 from the ECU 4d without passing through the driver circuit unit 34d.

As shown in FIG. 10, in the present embodiment, so-called fly back type booster circuit is formed at the input side of the discharging switch 32 (i.e., drain 32D) by the charging switch 31 and the energy storage coil 330.

The present invention is not limited to a specific operation that is exemplified in the above embodiments. In the present embodiment, the charging and discharging of the energy storage coil 330 are configured to be switched in accordance with a pulse signal that is switched to Hi and Lo at a predetermined duty ratio. However, as in the above embodiments, the supply of the primary current from the energy storage coil 330 (off of the charging switch 31 and on of the discharging switch 32) may also be controlled by providing the secondary current determiner 351 that determines by comparing the secondary current I2 detected by the discharge current detection resistor 352 with predetermined current thresholds I2thH, I2thL so that the secondary current becomes in a certain range.

A modification shown in FIG. 11B will be described.

In the present modification, when the discharge current (secondary current I2) is equal to or less than a predetermined secondary current lower threshold I2thL, the supply of the primary current to a low voltage side terminal of the primary winding 20 is performed, and when it is higher than a predetermined secondary current upper threshold I2thH, the supply of the primary current may be stopped.

Specifically, the secondary current I2 that is voltage-converted by the secondary current detection resistor 352 is inputted to a hysteresis comparator, and may be adjusted within a certain range by comparing the output with a threshold voltage that is fed back via a predetermined voltage dividing resistor.

The primary voltage V1 is threshold-determined by the primary voltage determiner 350a, a determination flag JDG1 is raised from 0 to 1, and during this period, the charging and discharging of the energy storage coil 330 that is provided as the auxiliary power supply 33d are repeated.

At this time, the secondary current I2 is compared with the predetermined secondary current upper threshold I2thH and the secondary current lower threshold I2thL by the secondary current determiner 351, and the discharging control signal $VG_{32}$ and the charging control signal $VG_{31}$ are alternately turned on. Thus, the supply of the primary current from the energy storage coil 330 to the primary winding 20 is performed.

Even in modifications not mentioned in particular, it is obvious that they are included in the technical scope of the present invention within the scope that does not change the essential parts of the present invention.

Moreover, each element functionally represented in elements that constitute the means for solving the problems of the present invention includes not only specific configurations and their equivalents disclosed in the embodiments and the modifications described above, but any structure capable of realizing the operation and function.

REFERENCE SIGNS LIST

1 . . . spark plug
2 . . . ignition coil
20 . . . primary winding
200 . . . high-voltage side terminal (non-ground side terminal)
201 . . . low-voltage side terminal (ground side terminal)
21 . . . secondary winding
210 . . . non-plug side terminal (non-ground side terminal)
211 . . . plug side terminal (ground side terminal)
3 . . . control circuit section
30 . . . ignition switch
30C . . . power supply side terminal for ignition (collector)
30G . . . control terminal for ignition (gate)
30E . . . ground side terminal for ignition (emitter)
31 . . . charging switch
31C . . . power supply side terminal for charging (collector)
31G . . . control terminal for charging (gate)
31E . . . ground side terminal for charging (emitter)
32 . . . discharging switch
32D . . . power supply side terminal for discharging (drain)
32G . . . control terminal for discharging (gate)
32S . . . ground side terminal for discharging 32S (source)
33 . . . auxiliary power supply
330 . . . energy storage coil
330V . . . power supply coil side terminal
330G . . . ground coil side terminal
331 . . . energy storage capacitor
332, 333, 334 . . . rectifier element (diode)
34 . . . driver circuit section
340 . . . charging driver
341 . . . discharging driver
35 . . . auxiliary energy requirement determiner
350 . . . primary voltage determiner
351 . . . secondary current determiner
352 . . . secondary current detector
4 . . . electronic control unit (ECU)
5 . . . DC power supply
6 . . . ignition system
7 . . . engine (internal combustion engine)
8 . . . intake and exhaust mechanism
9 . . . engine system
IGt . . . ignition signal
$VG_{31}$ . . . charging control signal
$VG_{32}$ . . . discharging control signal
IGw . . . discharge period signal
JDG1 . . . primary voltage determination signal
JDG2 . . . secondary current determination signal

The invention claimed is:

1. An ignition system comprising:
a spark plug that ignites fuel-air mixture in a cylinder of an engine;
a DC power supply;
an ignition coil that has a primary winding of which a high-voltage side terminal at one end is connected to the DC power supply and a secondary winding that is wound having a secondary number of turns with a predetermined winding ratio with respect to a primary number of turns of the primary winding, and generates a high secondary voltage in the secondary winding according to increase or decrease of a primary current flowing through the primary winding, and the spark plug is connected to a plug-side terminal that is one end of the secondary winding;
a control circuit section that controls discharge to the spark plug from the ignition coil; and
an electronic control unit that generates an ignition signal that controls ignition timing according to operating conditions of the engine and a discharge period signal that controls a start of discharging from an auxiliary power supply; wherein,
the control circuit section includes an auxiliary power supply having an energy storage coil that is charged at least by the DC power supply;
an ignition switch that has a control terminal for ignition, a power supply side terminal for ignition, and a ground side terminal for ignition, the ignition switch is a semiconductor element configured to control opening and closing of conduction between the power supply side terminal for ignition and the ground side terminal for ignition based on the ignition signal inputted to the control terminal for ignition, and the power supply side terminal for ignition of the ignition switch is connected to a ground side terminal on another end of the primary winding and the ground side terminal for ignition is grounded, and controls the start of discharging from the ignition coil to the spark plug by controlling the opening and closing of conduction from the DC power supply to the ignition coil;
a charging switch that has a control terminal for charging, a power supply side terminal for charging, and a ground side terminal for charging, and the charging switch is a semiconductor element configured to control opening and closing of conduction between the power supply side terminal for the charging and the ground side terminal for the charging based on a charging control signal inputted to the control terminal for the charging;
a discharging switch controls the discharge to the ignition coil from the auxiliary power supply, the charging switch has a control terminal for discharging, a power supply side terminal for discharging, and a ground side terminal for discharging, and the discharging switch is a semiconductor element configured to control opening and closing of conduction between the power supply side terminal for discharging and the ground side terminal for discharging based on a discharging control signal inputted to the control terminal for discharging;
a driver circuit section that controls the opening and closing of the ignition switch, the charging switch, and the discharging switch in accordance with the ignition signal and the discharge period signal; and
an auxiliary energy requirement determiner that determines whether or not an energy charge from the auxiliary power supply is necessary; wherein,
when the auxiliary energy requirement determiner determines that the discharge from the auxiliary power supply is necessary during the ignition discharge of the spark plug that has been started by turning the ignition switch off, in addition to storing electromagnetic energy in the energy storage coil by turning the charging switch on, a secondary current flowing through the secondary winding is increased or decreased by varying the primary current by supplying the electromagnetic energy to a low voltage side terminal of the primary winding from the auxiliary power supply by controlling the opening and closing of the charging switch and the discharging switch.

2. The ignition system according to claim 1, wherein,
the auxiliary energy requirement determiner has a secondary current detector that is connected to a non-plug-side terminal of another end of the secondary winding and detects a secondary current flowing through the secondary winding; and
the auxiliary energy requirement determiner has a secondary current determiner that stops the discharging from the auxiliary power supply by turning the discharging switch off by comparing a predetermined secondary current upper threshold with a secondary current lower threshold when the secondary current exceeds the secondary current upper threshold, and permits the discharging from the auxiliary power supply by turning the discharging switch on when the secondary current falls below the secondary current lower threshold.

3. The ignition system according to claim 1; wherein,
the auxiliary energy requirement determiner includes a primary voltage determiner that determines whether or not to discharge from the auxiliary power supply by detecting a primary voltage at the ground side terminal of the primary winding and by comparing the primary voltage with a predetermined primary threshold voltage.

4. The ignition system according to claim 1, wherein,
the auxiliary power supply includes one or more energy storage capacitors that store the electromagnetic energy stored in the energy storage coil and a sufficient number of the discharging switches corresponding to each of the energy storage capacitors between the charging switch and the discharging switch in addition to the energy storage coil.

5. The ignition system according to claim 1, wherein,
there is provided a primary voltage determiner that determines whether or not to discharge from the auxiliary power supply by detecting a primary voltage at the ground side terminal of the primary winding and by comparing the primary voltage with a predetermined primary threshold voltage; and
the primary voltage determiner predicts the secondary voltage that is proportional to a winding ratio of the ignition signal from the primary voltage at the time after the ignition signal falls and before the discharge period signal rises, and determines a discharge start timing from the auxiliary power supply.

6. The ignition system according to claim 3, wherein,
the primary voltage determiner predicts the secondary voltage that is proportional to a winding ratio of the ignition signal from the primary voltage at the time after the ignition signal falls and before the discharge period signal rises, and determines a discharge start timing from the auxiliary power supply.

7. The ignition system according to claim 4, wherein,
there is provided a primary voltage determiner that determines whether or not to discharge from the auxiliary power supply by detecting a primary voltage at the ground side terminal of the primary winding and by comparing the primary voltage with a predetermined primary threshold voltage; and
the primary voltage determiner predicts the secondary voltage that is proportional to a winding ratio of the ignition signal from the primary voltage at the time after the ignition signal falls and before the discharge period signal rises, and determines a discharge start timing from the auxiliary power supply.

8. The ignition system according to claim 7, wherein,
the auxiliary power supply includes a plurality of energy storage capacitors;
the primary voltage determiner detects the discharging voltage of the energy storage capacitors when the discharging switch is turned on;
by comparing the discharging voltage with a predetermined discharging voltage threshold, when the discharging voltage is higher than the discharging voltage threshold, it is determined that the discharging from at least one of the plurality of energy storage capacitors is not necessary, and at least one of the plurality of discharging switches is turned off in order to stop the discharging from the energy storage capacitor; and
when the discharging voltage is lower than the discharging voltage threshold, it is determined that the discharging from the plurality of energy storage capacitors is necessary, and the plurality of discharging switches are turned on.

9. The ignition system according to claim 1, wherein,
a rectifier element that allows a current flowing toward the power supply side terminal for ignition from the ground side terminal for ignition and blocks the current flowing in the opposite direction is provided between the ground side terminal for ignition and the power supply side terminal for ignition of the ignition switch.

* * * * *